United States Patent
Furomoto

(10) Patent No.: US 7,427,432 B2
(45) Date of Patent: Sep. 23, 2008

(54) OPTICAL RECORDING MEDIUM

(75) Inventor: Shigeyuki Furomoto, Minato-ku (JP)

(73) Assignee: Mitsubishi Kagaku Media Co., Ltd., Tokyo (JP)

(*) Notice: Subject to any disclaimer, the term of this patent is extended or adjusted under 35 U.S.C. 154(b) by 0 days.

(21) Appl. No.: 11/412,958

(22) Filed: Apr. 28, 2006

(65) Prior Publication Data
US 2006/0194017 A1    Aug. 31, 2006

Related U.S. Application Data

(63) Continuation of application No. PCT/JP2005/012412, filed on Jul. 5, 2005.

(30) Foreign Application Priority Data
Jul. 6, 2004    (JP) .............. 2004-199770

(51) Int. Cl.
*B32B 3/02*    (2006.01)
(52) U.S. Cl. .............. 428/64.1; 428/64.4; 428/64.8; 430/270.11; 430/270.14
(58) Field of Classification Search .......... 428/64.1, 428/64.4, 64.8; 430/270.11, 270.14
See application file for complete search history.

(56) References Cited

U.S. PATENT DOCUMENTS 6,063,468 A * 5/2000 Aratani et al. ........... 428/64.1
6,699,591 B2 * 3/2004 Ishida et al. ............. 428/641
2002/0086237 A1 * 7/2002 Takamori et al. ........ 430/273.1
2004/0027981 A1 * 2/2004 Schoeppel ............... 369/275.4

FOREIGN PATENT DOCUMENTS

| JP | 03-232132 | 10/1991 |
| JP | 2000-311384 | 11/2000 |
| JP | 2002-230834 | 8/2002 |
| JP | 2004-055117 | 2/2004 |
| JP | 2004-118966 | 4/2004 |

* cited by examiner

*Primary Examiner*—Elizabeth Mulvaney
(74) *Attorney, Agent, or Firm*—Oblon, Spivak, McClelland, Maier & Neustadt, P.C.

(57) ABSTRACT

A dual-layer optical recording medium, which is formed by adhering a disk substrate (inverted-stack structure) formed by stacking a reflective layer (1) and a recording layer (1) on a substrate (1) and a disk substrate (conventional-stack structure) formed by sequentially stacking a recording layer (2) and a reflective layer (2) on a transparent substrate (2) with a transparent resin layer interposed therebetween, is prepared such that the transparent resin layer has a product obtained by multiplying the thickness by the elastic modulus at 25±5° C. falling within the range of not less than $2.0 \times 10^4$ MPa·μm to not more than $30.0 \times 10^4$ MPa·μm, resulting in suppressing excessive deformation involving an adjacent track portion produced by recording optical information in the recording layer (1) of the inverted-stack structure, thereby reducing crosstalk and providing satisfactory recording and/or reading characteristics in high-speed recording applications.

11 Claims, 6 Drawing Sheets

OPTICAL RECORDING MEDIUM

FIELD OF THE INVENTION

The present invention relates to an optical recording medium, and more particularly, an optical recording medium capable of attaining high-speed recording and providing satisfactory recording and/or reading characteristics.

BACKGROUND ART

It is known that various types of optical recording media such as CD-R, CD-RW and MO can store a large volume of data. In addition, a randomly accessible medium such as DVD-RAM has recently been developed and widely known as an external memory on information processing equipment such as a computer. For example, a representative example, CD-R, which has a recording layer containing an organic dye, has a laminated structure formed by stacking a dye recording layer and a reflective layer in this order on a transparent disk substrate and further placing a protective layer so as to cover these recording layer and reflective layer. Recording and/or reading are performed by laser light passing through the substrate. Furthermore, to increase the recording capacity of these optical recording media, a multilayered optical recording medium having a plurality of recording layers provided in a single medium has been developed. For example, a dual-layer optical recording medium having two dye recording layers formed on a first transparent disk-form substrate and arranged with an intermediate layer formed of a UV curable resin interposed between them, is reported in Patent Document 1.

It is known that such the dual-layer optical recording medium is formed by the 2P (Photo Polymerization) method using a transparent stamper and by a method comprising forming two disk substrates each having a recording layer and a reflective layer stacked thereon and adhering the two disk substrates with a photocurable resin layer interposed between them. To explain more specifically, the 2P method comprises applying a photocurable resin material onto a first substrate having a first recording layer and a first reflective layer formed thereon, mounting a transparent stamper having irregular forms on the surface coated with the resin, permitting the photocurable resin material to cure, removing the transparent stamper to transfer irregular forms on the surface of the photocurable resin, forming a second recording layer and a second reflective layer sequentially on the irregular surface, and finally adhering a second substrate. Optical information is recorded on and read from the two recording layers by use of recording and/or reading light incident upon the first substrate.

In the method of adhering two disk substrates each having a recording layer and a reflective layer stacked thereon, a dual-layer optical recording medium is manufactured by forming a first disk substrate (hereinafter sometimes referred to as a "conventional-stack structure") by stacking a recording layer and a reflective layer in this order on a substrate having a guide groove serving as recording truck formed therein, forming a second disk substrate by stacking a reflective layer and a recording layer in this order (hereinafter sometimes referred to as an "inverted-stack structure") on a substrate, applying a photocurable resin onto each of the disk substrates, combining them such that the resin applied surfaces face each other, and curing the photocurable resin. Optical information is recorded on and read from the two recording layers by use of recording and/or reading light incident on the first substrate. The method of adhering two disk substrates does not require a step of transferring convexes and concaves forms of a transparent stamper, unlike the 2P method. This method is therefore considered excellent in productivity and attaining cost reduction.

Patent Document 1: Japanese Patent Laid-Open No. 2000-311384, Columns [0008] to [0019]

DISCLOSURE OF THE INVENTION

Problems to be Solved by the Invention

In an optical recording medium having a recording layer containing an organic dye, there is a desire of further suppressing generation of crosstalk during high-speed recording.

More specifically, generally in the recording layer containing an organic dye, the organic dye absorbs converged recording laser light and then decomposes. As a result, the thickness of the film where the dye is present reduces; at the same time, pressure increases. Since the portion around the recording layer is exposed to high temperature, the portion deforms to form a recording portion. In this case, if the deformed recording portion expands into the adjacent track areas and further if the recording is made in a plurality of tracks, crosstalk tends to increase, leading to a phenomenon where satisfactory jitter is difficult to obtain.

In the present invention, MT (%) means the jitter obtained when recording is made on multiple tracks and signals recorded on adjacent both-side tracks are read. Furthermore, ST (%) means the jitter obtained when recording on a single track with two adjacent tracks remained empty is read. MT (%) includes influence of crosstalk but ST (%) includes no influence of crosstalk.

Furthermore, in high-speed recording, since the recording pulse is shortened, much higher laser power is needed in order to decompose the dye in case of high-speed recording than that of low-speed recording. As a result, the recording layer is exposed to higher temperature than that of the low-speed recording, crosstalk tends to be significantly increased.

The generation of crosstalk is significantly observed in the second layer placed in far side from the incident surface of the recording and/or reading light in a dual-layer optical recording medium formed by adhering two disk substrates. As described above, the second deepest recording layer of the dual-layer optical recording medium formed by the method of adhering two disk substrates is present within a disk substrate of the inverted-stack structure, in which a reflective layer and the recording layer are stacked on a substrate. When optical information is recorded on the inter-grooves portion of the substrate in such an inverted-stack structure, the thickness of the recording layer of the inter-grooves portion must be increased in order to ensure recording modulation amplitude. In this case, since the adjacent track of the recording portion corresponds to a groove of the substrate, the film thickness of the recording layer in the groove portion is likely to increase than that in the inter-grooves portion. Therefore, in case where the film thickness of the recording layer of the groove increases, the recording mark is laterally expanded and the crosstalk is easily increased. The thickness of the recording layer tends to differ in case of spin-coating of an organic dye solution between in the groove portion and in the inter-grooves portion.

In the second substrate placed in far side from the incident surface of recording and/or reading light in the dual-layer optical recording medium, the depth of a guide groove is set shallower than a conventional one in order to ensure reflectivity of the recording and/or reading light. As a result, a physical barrier effect of the guide groove decreases, allowing excessive deformation such as that of the substrate caused by a resin flow and so on during the time of recording. Therefore, the crosstalk is easily increased.

The present invention has been achieved with the view toward solving such problems.

More specifically, an object of the present invention is to provide an optical recording medium capable of providing satisfactory recording and/or reading characteristics in high-speed recording applications.

SUMMARY OF THE INVENTION

To solve the aforementioned problems, in the present invention, the transparent resin layer in contact with an inverted-stack structure has a product (E×t) obtained by multiplying the elastic modulus (E) by the thickness (t) within a specific range.

More specifically, according to the present invention, there is provided an optical recording medium comprising an inverted-stack structure having a substrate, a reflective layer, and a recording layer in this order, and a transparent resin layer arranged on the recording layer side of the inverted-stack structure, in which the transparent resin layer has a product (E×t) obtained by multiplying the thickness (t) by the elastic modulus (E) at 25±5° C. of $2.0 \times 10^4$ MPa·μm or more.

In the present invention, the transparent resin layer preferably has a product (E×t) obtained by multiplying the thickness (t) by the elastic modulus (E) at 25±5° C. of $30.0 \times 10^4$ MPa·μm or less.

It is further preferable that the elastic modulus (E) of a resin forming the transparent resin layer at 25±5° C. is not less than $3.0 \times 10^3$ MPa and is not more than $6.0 \times 10^3$ MPa.

In the optical recording medium to which the present invention is applied, it is preferable that the recording layer forming the inverted-stack structure contains an organic dye. In particular, in the dual-layer optical recording medium shown in FIG. 1 (described later), crosstalk is reduced when recording is made on the inverted-stack structure constituted by a substrate, a reflective layer, and a recording layer, thereby improving MT (%). Note that another layer may be appropriately provided between the substrate and the reflective layer or between the reflective layer and the recording layer.

In the optical recording medium to which the present invention is applied, it is preferable that an intermediate layer be further provided between the recording layer forming the inverted-stack structure and the transparent resin layer in contact with the recording layer. The intermediate layer thus provided can prevent component(s) penetrating from the transparent resin layer from contaminating and dissolving the recording layer in contact with the transparent resin layer.

Furthermore, in the optical recording medium to which the present invention is applied, by arranging a second reflective layer, a second recording layer, and a transparent substrate sequentially on the side of the transparent resin layer in contact with the inverted-stack structure and opposite to the side on which the inverted-stack structure is arranged, it is possible to develop a multilayered optical recording medium.

On the other hand, the present invention may be figured out as an optical recording medium comprising a recording layer in which optical information is recorded and read by irradiation with light; a transparent resin layer arranged on the light incident surface of the recording layer; and a reflective layer arranged on the side of the recording layer opposite to the light incident surface, in which the transparent resin layer has a product (E×t) obtained by multiplying the thickness (t) by the elastic modulus (E) at 25±5° C. of $2.0 \times 10^4$ MPa·μm or more.

To explain more specifically, in an optical recording medium in which a transparent resin layer exhibiting a specific value of (E×t) is arranged on the light incident surface of the recording layer having a reflective layer arranged on the opposite side to the light incident surface, excessive deformation involving the adjacent track portion(s) can be suppressed, with the result that crosstalk during high-speed recording can be reduced and further jitter can be improved. Such improvement is not only made in a film surface incident type optical recording medium but also is significantly made in the recording layer which is the farther side from the light incident side.

In the present invention, the transparent resin layer is preferably composed of a transparent resin having a glass transition temperature of 150° C. or more. By forming such transparent resin layer, the rigidity of the transparent resin layer is increased and thereby the jitter is conceivably improved.

According to the present invention, there is provided an optical recording medium comprising a substrate, a reflective layer, a recording layer and a transparent resin layer in this order, wherein the reflective layer contains a metal having Ag as a main component and a film thickness of not less than 30 nm and of not more than 80 nm.

The optical recording medium to which the present invention is applied has an inverted-stack structure comprising a substrate, a reflective layer, a recording layer, and a transparent resin layer in this order, in which the reflective layer contains a metal having Ag as a main component and a film thickness of not less than 30 nm and of not more than 80 nm. By virtue of this structure, part of the light beam irradiated from the recording layer can be passed through the reflective layer. In such a case, the energy for recording information on the recording layer is diffused, and it is possible to suppress a phenomenon called crosstalk where recording mark protrudes into adjacent tracks in a write-once type optical recording medium on which the recording mark is formed in a recording layer containing an organic dye. As a result, jitter can be improved.

In this case, the reflective layer preferably contains Ag in an amount of 50% or more, and further preferably contains, other than Ag as a main component, one or more elements among Ti, Bi, Zn, Cu and Pd and rare earth metals in an amount from 0.1% by atom to 15% by atom.

EFFECT OF THE INVENTION

As mentioned above, according to the present invention, there is provided an optical recording medium capable of providing satisfactory recording and/or reading characteristics in high-speed applications.

BRIEF DESCRIPTION OF THE DRAWINGS

FIGS. 3 are views for explaining a thickness (t) of a transparent resin layer.

DETAILED DESCRIPTION OF THE PREFERRED EMBODIMENT

Now, best modes (hereinafter referred to as "embodiments") for carrying out the invention will be explained. Note that the present invention is not limited to the embodiments below and may be modified in various ways within the scope of the gist of the invention and put in use.

First Embodiment

Figure 1:
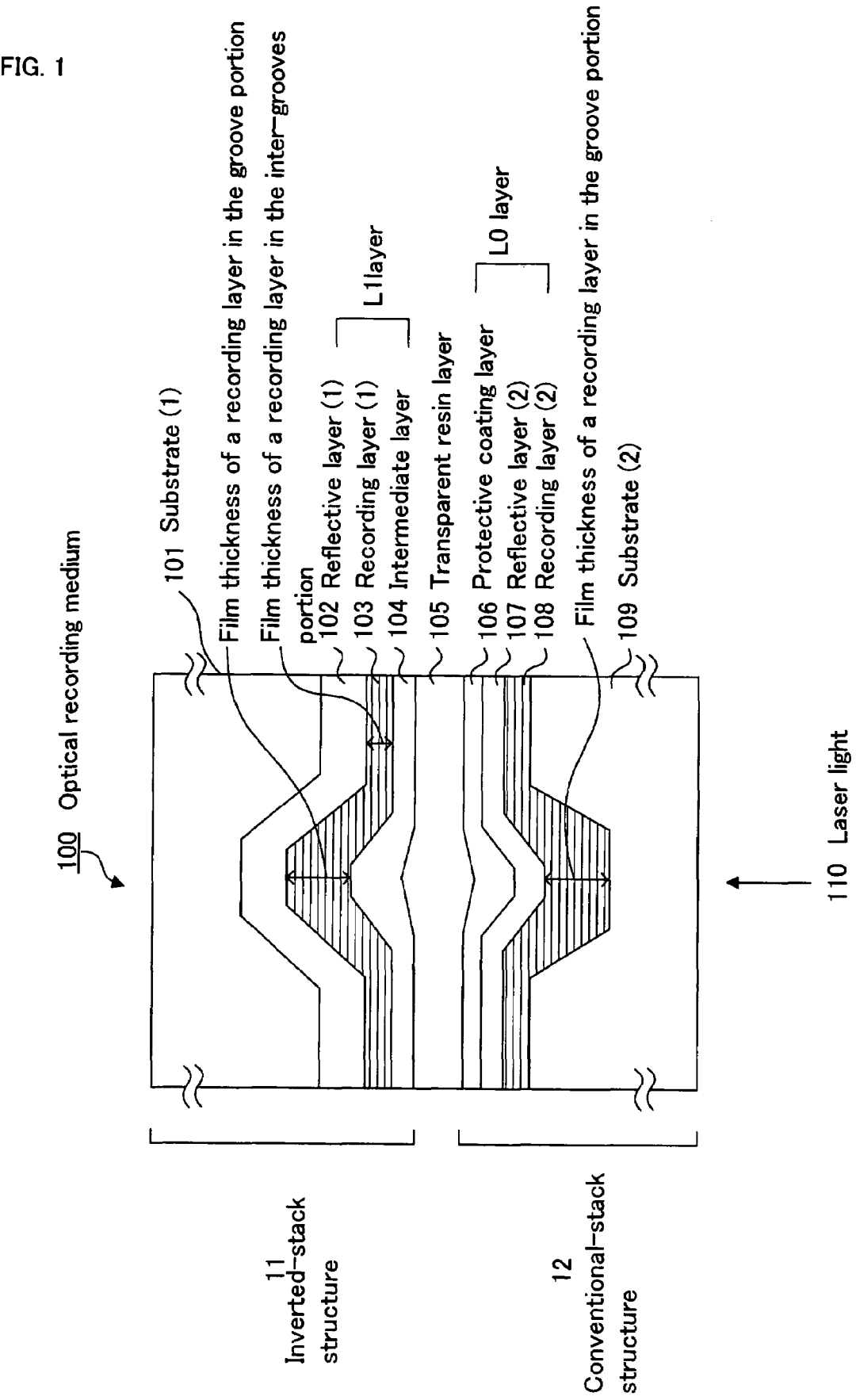
FIG. 1 is a view for explaining a first embodiment of an optical recording medium to which the present embodiment is applied.

FIG. 1 illustrates a first embodiment of an optical recording medium to which the present invention is applied, that is, one-side incident type dual-layer DVD in this example. FIG. 1 shows a dual-layer optical recording medium 100 consisting of a disk substrate (inverted-stack structure 11) which is formed by stacking a reflective layer and a recording layer on a transparent substrate, and a disk substrate (conventional-stack structure 12), which is formed by sequentially stacking a recording layer and a reflective layer stacked on a transparent substrate.

As shown in FIG. 1, the optical recording medium 100 has an inverted-stack structure 11, which has a disk-form light-transmissible substrate (1) 101 having a groove, a land or a prepit therein, a reflective layer (1) 102, which is arranged on the substrate (1) 101 at the incident surface side of laser light 110, a recording layer (1) 103 containing a dye, and an intermediate layer 104. Furthermore, the optical recording medium 100 has a conventional-stack structure 12, which has a disk-form light-transmissible substrate (2) 109 having a groove, a land or a prepit formed therein, a recording layer (2) 108 containing a dye and formed on the substrate (2) 109, a semi-transparent reflective layer (2) 107 for dispersing the power of the laser light 110 irradiated from the substrate (2) 109, and a protective coating layer 106 arranged on the reflective layer (2) 107. The inverted-stack structure 11 and the conventional-stack structure 12 are stacked with the transparent resin layer 105 interposed between them such that the intermediate layer 104 and the protective coating layer 106 face each other to form the dual-layer optical recording medium 100. In the recording layer (1) 103 and the recording layer (2) 108, recording and/or reading of optical information is performed by laser light 110 irradiated from the substrate (2) 109 of the conventional-stack structure 12.

(Inverted-stack Structure)

Individual layers of the inverted-stack structure 11 forming the optical recording medium 100 will be explained. As shown in FIG. 1, the inverted-stack structure 11 is constituted of the substrate (1) 101, the reflective layer (1) 102, the recording layer (1) 103, and the intermediate layer 104 (these three layers hereinafter will sometimes be referred to as a "L1 layer") stacked on the substrate (1) 101.

(Substrate (1))

A material forming the substrate (1) 101 desirably has transmissibility and excellent optical characteristics, such as small birefringence. Furthermore, it desirably has excellent moldability such as convenience in injection molding and low hygroscopicity. Moreover, the material desirably has morphological stability so as to obtain rigidity to the optical recording medium 100 to some extent. Examples of such a material include, although not particularly limited to, acrylic resins, methacrylic resins, polycarbonate resins, polyolefin resins (in particular, amorphous polyolefin), polyester resins, polystyrene resins, epoxy resins, and glass. In addition, use can be made of a material having a resin layer formed of a radiation setting resin such as a photosetting resin, on a glass substrate. Of them, a polycarbonate is preferable in terms of optical characteristics, high productivity such as moldability, cost performance, low hygroscopicity, morphological stability and so on. Furthermore, an amorphous polyolefin is preferable in view of chemical resistance, low hygroscopicity and the like. Moreover, a glass substrate is preferable in view of high-speed response and the like.

The substrate (1) 101 is not necessarily light transparent. Thus, a back lining made of an appropriate material may be attached in order to increase mechanical stability and rigidity. Examples of such a material may include Al alloy substrate such as Al—Mg alloy containing Al as a main component, Mg alloy substrate such as Mg—Zn alloy containing Mg as a main component, and a substrate such as silicon, titanium, ceramic, paper, and a combination of these.

The depth of a guide groove of the substrate (1) 101 forming the inverted-stack structure 11 is generally $\lambda/100$ or more, preferably $2\lambda/100$ or more, and more preferably, $3\lambda/100$ or more where $\lambda$ is a recording and/or reading wavelength; however, the depth is preferably $\lambda/6$ or less. To explain more specifically, in the case where the wavelength $\lambda$ of recording and/or reading light (recording and/or reading wavelength) is 660 nm, the depth of a groove of the substrate (1) 101 is generally 6.6 nm or more, preferably 13 nm or more, and further preferably, 20 nm or more.

The upper limit of the groove depth of the substrate (1) 101 in this case is preferably set at 110 nm or less. Particularly in the case of the optical recording medium 100 to which this embodiment is applied, the light quantity and reflective light quantity of the laser light 110 incident on the recording layer (1) 103 through the substrate (2) 109 and the transparent resin layer 105 are attenuated by the recording layer (2) 108 and the reflective layer (2) 107, lowering reflectivity. Therefore, the upper limit of the groove depth is preferably $7\lambda/100$ or less. To explain more specifically, provided that the recording and/or reading wavelength ($\lambda$) is 660 nm, it is preferable to set the groove depth of the substrate (1) 101 at 46.2 nm or less, and more preferably, $6\lambda/100$ or less.

The width of a groove of the substrate (1) 101 of the inverted-stack structure 11 is generally T/100 or more, preferably 2 T/10 or more, and further preferably, 3 T/10 or more where T is a track pitch; however generally 8 T/or less, preferably 7 T/10 or less, and further preferably 6 T/10 or less. If the groove width of the substrate (1) 101 falls within the aforementioned range, tracking can be satisfactorily performed to obtain sufficient reflectivity. To explain more specifically, provided that the track pitch is 740 nm, the groove width of the substrate (1) 101 is generally set at 74 nm or more, preferably 148 nm or more, and further preferably 222 nm or more. The upper limit of this case is generally 592 nm or less, more preferably 518 nm or less, and further preferably 444 nm or less. The substrate (1) 101 is preferably thick to some extent. The thickness of the substrate (1) 101 is generally preferred to be 0.3 mm or more; however, 3 mm or less and preferably 1.5 mm or less.

(Reflective Layer (1))

A material constituting the reflective layer (1) 102 of the inverted-stack structure 11 is not particularly limited; however, metals or semimetals such as Au, Al, Ag, Cu, Ti, Cr, Ni, Pt, Ta, Pd, Mg, Se, Hf, V, Nb, Ru, W, Mn, Re, Fe, Co, Rh, Ir, Zn, Cd, Ga, In, Si, Ge, Te, Pb, Po, Sn, Bi, and rare earth metals can be used singly or in the form of an alloy. Among them, Au, Al, and Ag are preferable and in particular, a metal material containing Ag in an amount of 50% or more is preferable in view of low cost and high reflectivity.

Furthermore, it is preferable that Ag is contained as a main component and at least one type of element selected from the group consisting of Ti, Zn, Cu, Pd, Au and rare earth metals in an amount of 0.1% by atom to 15% by atom. In the case where two or more elements of Ti, Bi, Zn, Cu, Pd, Au and rare earth metals are contained, the content of each element may fall within the range of 0.1 to 15% by atom; however, the total amount of such elements preferably falls within the range from 0.1% by atom to 15% by atom.

A further preferable alloy composition contains Ag as a main component and at least one type of element selected from the group consisting of Ti, Bi, Zn, Cu, Pd and Au in an amount of 0.1% by atom to 15% by atom and, if necessary, at least one type of rare earth metal in an amount of 0.1% by atom to 15% by atom. Among the rare earth metals, neodymium is particularly preferable. Specific examples of the alloy compositions include AgPdCu, AgCuAu, AgCuAuNd, AgCuNd, AgBi, and AgBiNd. The component ratio of the alloy to be used in this embodiment falls within the aforementioned range.

Note that the phrase "Ag as a main component" means that Ag is generally contained in an amount of 50% or more, preferably 70% or more, and more preferably 80% or more in an alloy composition. Alternatively, pure Ag can be used.

As the reflective layer (1) 102, a layer consisting of Au alone is preferable since it has small crystal grains and excellent corrosion resistance. Alternatively, a layer composed of Si can be used as the reflective layer (1) 102. Furthermore, a multilayered film, which is formed by alternately stacking a low reflective thin film and a high reflective thin film, each being made of a material except for a metal, may be used as the reflective layer.

A method of forming the reflective layer (1) 102, mention may be made of sputtering method, ion plating method, chemical vapor deposition method, and vacuum vapor deposition method, etc.

The reflective layer (1) 102 of the inverted-stack structure 11 desirably has high reflectivity and high durability. To ensure high reflectivity, the thickness of the reflective layer (1) 102 is generally 30 nm or more, preferably 40 nm or more, and further preferably 50 nm or more; however, generally 400 nm or less and preferably 300 nm or less in order to reduce the takt time for production to reduce cost.

In the optical recording medium 100 to which this embodiment is applied, when the reflective layer (1) 102 of the inverted-stack structure 11 contains a metal containing a silver as a main component, the film thickness of the reflective layer (1) 102 falls further preferably within the range from 30 nm to 80 nm. In particular, when the film thickness of the reflective layer (1) 102 containing silver as a main component falls within the range from 30 nm to 80 nm, a decrease of reflectivity of the reflective layer (1) 102 is balanced with an increase of the transmission thereof, causing energy diffusion, with the result that crosstalk tends to be improved.

Figure 5A:
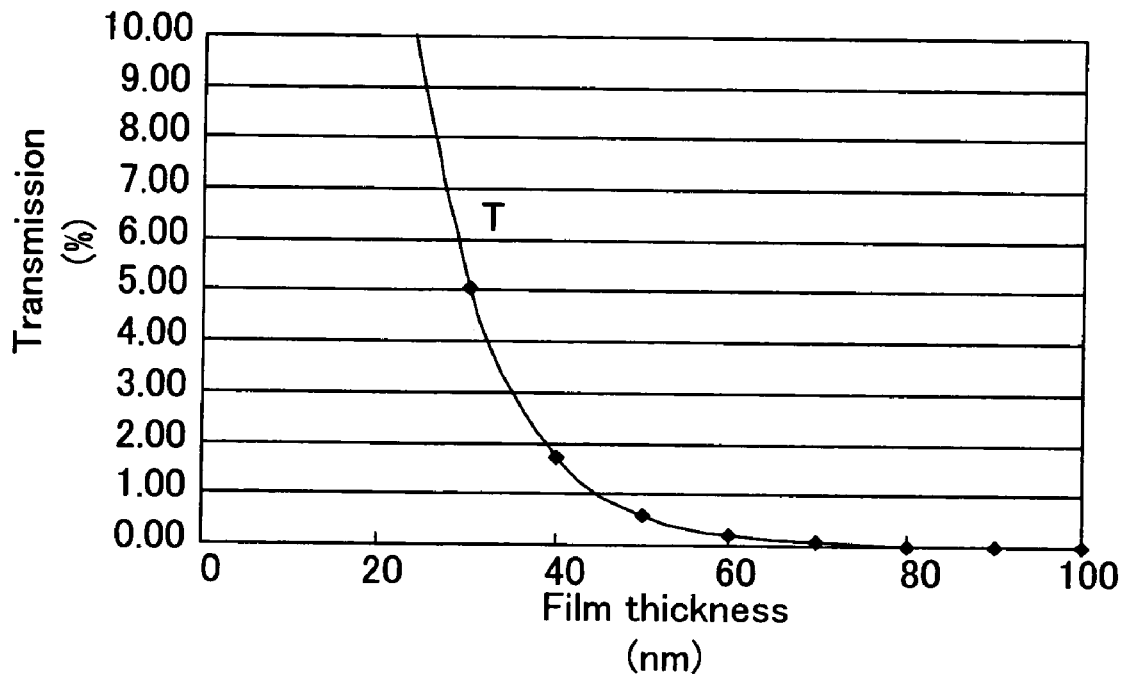
FIG. 5 are views for explaining a relationship between a film thickness of the reflective layer and transmission (T), and a relationship between a film thickness of the reflective layer and reflectivity (R)
Figure 5B:
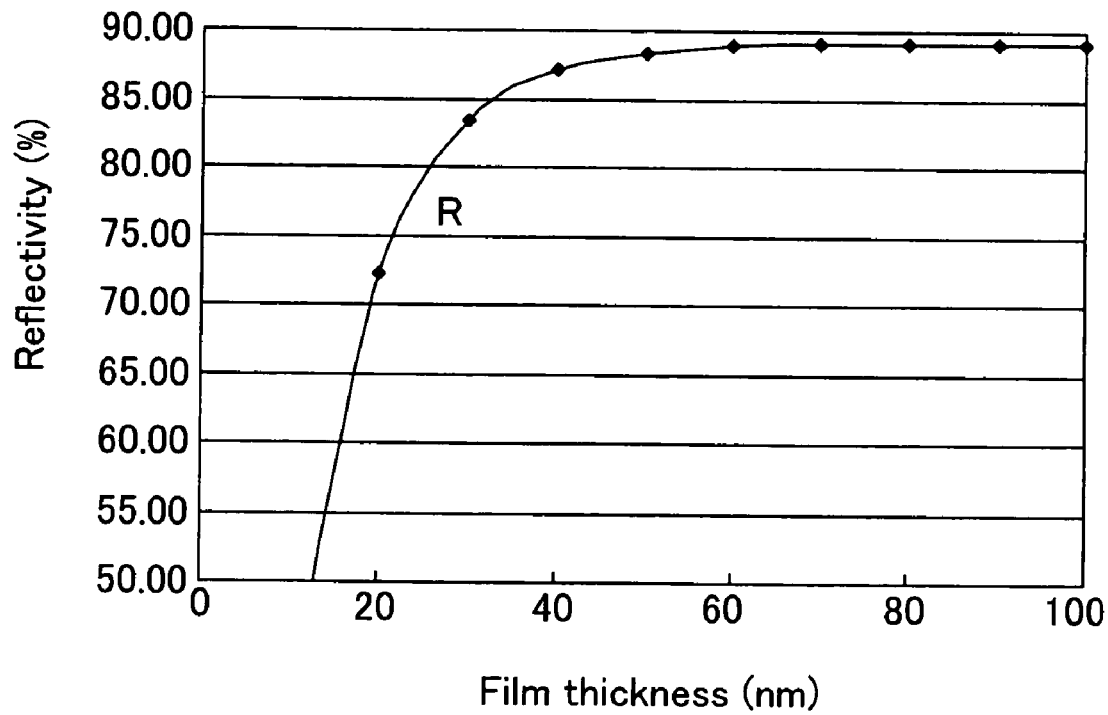

In the inverted-stack structure 11, when the reflective layer (1) 102 contains a metal containing silver as a main component and whose film thickness falls within the aforementioned specific range, crosstalk tends to be improved conceivably for the reason set forth below. This is because the thinner the film thickness of the reflective layer (1) 102, the lower the reflectivity (R) of the reflective layer (1) 102 and conversely, the higher the transmission (T) of the reflective layer (1) 102. The relationships between the film thickness of the reflective layer and the transmission (T), and the film thickness of the reflective layer and the reflectivity (R) are illustrated in FIG. 5. More specifically, FIG. 5(a) shows the relationship between the film thickness of the reflective layer and the transmission (T), and FIG. 5(b) shows the relationship between the film thickness of the reflective layer and the reflectivity (R). As shown in FIG. 5(a), as the film thickness of the reflective layer is reduced from about 80 nm, the transmission (T) increases. When the film thickness is lower than about 30 nm, the transmission (T) exceeds 5%. Also as shown in FIG. 5(b), as the film thickness of the reflective layer is reduced from about 80 nm, the reflectivity (R) decreases. When the film thickness is lower than about 30 nm, the reflectivity (R) becomes less than 85%. Note that, in FIG. 5, the reflectivity (R) and the transmission (T) are calculated with respect to a single layered Ag reflective layer (having a refractive index (n) of 0.05, and an extinction coefficient (k) of 4.25) when light having a wavelength of 650 nm is applied.

Likewise, along with an increase of the transmission (T) of the reflective layer (1) 102, energy diffusion takes place. Then, thermal interference decreases within a recording mark and between recording marks during the time of recording in the recording layer (1) 103. As a result, excessive heat accumulation or change (deformation) in the recording layer (1) 103 is conceivably suppressed, reducing crosstalk.

Furthermore, when the film thickness of the reflective layer (1) 102 is formed thinner than a conventional one, the reflective layer (1) 102 appears to faithfully follow (trace) the shape of a groove of the substrate. Therefore, even in the case where the track pitch is narrowed, the groove and the inter-grooves portion can be distinguishably separated. For this reason, the crosstalk may possibly be reduced.

However, it is not preferable to extremely reduce the film thickness of the reflective layer (1) 102, because the reflectivity (R) sharply decreases. Therefore, the film thickness of the recording layer (1) 103 is preferably 30 nm or more, and more preferably, 40 nm or more. Generally, the reflective layer including metal containing silver as a main component has a film thickness of 100 nm or more. In this case, the transmission (T) is low and thus energy diffusion rarely takes place. Therefore, the film thickness of the recording layer (1) 103 is preferably 80 nm or less.

When the reflective layer (1) 102 is formed with a film thickness of less than 100 nm generally employed, not only sputtering time but also a temperature increase of the substrate (1) 101 during sputtering can be reduced and therefore migration of the atoms is mitigated during sputtering. As a result, the reflective layer (1) 102 with good quality can be formed in small grain size, and with less surface roughness, improving cost performance.

(Recording Layer (1))

The recording layer (1) 103 of the inverted-stack structure 11 generally contains a dye having the same sensitivity as that used in one sided recording medium such as CD-R, DVD-R, and DVD+R. Such a dye preferably has a maximum absorption wavelength (λmax) in the region of visible light to near infrared (about from 350 nm to 900 nm) and suitable for recording by a blue to near microwave laser. Among them, a dye suitable for recording by a near infrared laser having a wavelength of about from 770 nm to 830 nm (more specifically 780 nm, 830 nm) generally used in CD-R, an red laser having a wavelength of about 620 nm to 690 nm (more specifically 635 nm, 660 nm and 680 nm) used in DVD-R, and a blue laser of a wavelength of 410 nm or 515 nm, may be more preferable. Note that a phase-change type material can be used.

The dye to be used in the recording layer (1) 103 is not particularly limited; however generally organic dye is used. Examples of such organic dye types include macrocyclic aza-annulene dyes (such as phthalocyanine dye, naphthalocyanine dye, porphyrin dye), pyrromethene dyes, polymethine dyes (such as cyanine dye, merocyanine dye, squarylium dye), anthraquinone dyes, azulenium dyes, metal-containing azo dyes, and metal-containing indoaniline dyes. Of them, the metal-containing azo dyes are preferable since they have excellent recording sensitivity, durability and light resistance. These dyes may be used singly or in the form of a mixture of two or more types.

Furthermore, to improve stability and light resistance of the recording layer, the recording layer (1) 103 may contain a transition metal chelate compound serving as a singlet oxygen quencher (for example, acetylacetonate chelate, biphenyldithiol, salicylaldehydes oxime, bisdithio-α-diketone), and the like. To improve recording sensitivity, the layer may contain a recording sensitivity improver such as a metallic compound. The term "metallic compound" refers to a compound containing a metal such as a transition metal in the form of atom, ion, cluster or the like. Examples of such a metallic compound include organometal compounds such as ethylenediamine complexes, azomethine complexes, phenylhydroxyamine complexes, phenanthroline complexes, dihydroxyazobenzene complexes, dioxime complexes, nitrosoaminophenol complexes, pyridyltriazine complexes, acetylacetonate complexes, metallocene complexes, and porphyrin complexes. The metal atom is not particularly limited; however a transition metal is preferably used.

Furthermore, to the recording layer (1) 103, if necessary, a binder, labeling agent, and defoaming agent, etc., may be added. Preferable examples of the binder include polyvinyl alcohol, polyvinyl pyrrolidone, nitrocellulose, acetylcellulose, ketone resin, acrylic resin, polystyrene resin, urethane resin, polyvinyl butyral, polycarbonate, and polyolefin.

A method of depositing the recording layer (1) 103 is not particularly limited; however a general thin film forming method, such as a vacuum vapor deposition method, sputtering method, doctor blade method, cast method, spin coating method, and soaking method, may be mentioned. In terms of mass production and cost performance, a wet film coating method such as a spin coating method is preferable. On the other hand, in terms of obtaining a uniform recording layer, a vapor deposition method is preferable.

In depositing by the spin coating method, spin coating is preferably performed at a rotation speed of 10 rpm to 15,000 rpm, and thereafter, heat treatment is generally performed to remove a solvent. When the recording layer is formed by a coating method such as a doctor blade method, cast method, spin coating method, or soaking method, the coating solvent to be used is not particularly limited and any solvent may be used as long as it does not damage the substrate. Examples of such a solvent include ketone alcohol solvents such as diacetone alcohol, and 3-hydroxy-3-methyl-2-butanone; cellosolve solvents such as methyl cellosolve and ethyl cellosolve; chain form hydrocarbon solvents such as n-hexane and n-octane; ring-form hydrocarbon solvents such as cyclohexane, methylcyclohexane, ethylcyclohexane, dimethylcyclohexane, n-butylcyclohexane, tert-butylcyclohexane, and cyclooctane; perfluoroalkyl alcohol solvents such as tetrafluoropropanol, octafluoropentanol, and hexafluorobutanol; and hydroxycarboxylic ester solvents such as methyl lactate, ethyl lactate, and methyl 2-hydroxyisobutyrate.

The heat treatment for removing such a solvent is generally performed at a temperature slightly lower than the boiling point of the solvent to be used, generally in the range of 60° C. to 100° C., in terms of removing a solvent by a simple apparatus. The method for heat treatment is not particularly limited. For example, mention is made of a method comprising applying a dye-containing solution onto the substrate (1) 101 to form a film of a recording layer (1) 103, and maintaining the film at a predetermined temperature for a predetermined time (generally 5 minutes or more, preferably 10 minutes or more; however, 30 minutes or less and preferably 20 minutes or less). Alternatively, infrared rays or far infrared rays may be applied for a short time (for example, 5 seconds to 5 minutes), to heat the substrate (1) 101.

The vacuum deposition method is performed by, placing for example, an organic dye and, if necessary, components for a recording layer such as various additives in a crucible placed in a vacuum chamber, evaluating the vacuum chamber by an appropriate vacuum pump to a pressure of about $10^{-2}$ to $10^{-5}$ Pa, heating the crucible to vaporize the recording-layer components, thereby depositing the components onto the substrate placed facing the crucible.

The thickness of the recording layer (1) 103 of the inverted-stack structure 11 is generally 50 nm or more, and preferably 60 nm or more; however, generally 150 nm or less, and preferably 100 nm or less. If the thickness of the recording layer (1) 103 falls within the range, it is possible to suppress a decrease in sensitivity while maintaining sufficient amplitude of a recording signal. When the thickness of the recording layer (1) 103 is excessively large, the sensitivity may decrease in some cases.

(Intermediate Layer)

The intermediate layer 104 is provided on the inverted-stack structure 11, as needed. Generally, the intermediate layer 104 is provided between the recording layer (1) 103 and the transparent resin layer 105 in order to prevent contamination and dissolution of the recording layer (1) 103 with a component(s) penetrating from the transparent resin layer 105. The thickness of the intermediate layer 104 is generally 1 nm or more, and preferably 2 nm or more. If the thickness of the intermediate layer 104 falls within the range, it is possible to efficiently prevent the component(s) penetrating from the transparent resin layer 105. However, the thickness of the intermediate layer 104 is preferably 2,000 nm or less, and more preferably, 500 nm or less. If the thickness of the intermediate layer 104 falls within the range, a decrease in light transmission can be prevented. Furthermore, when the intermediate layer 104 is formed of an inorganic substance (s), it takes time to form a film in some cases. In order to prevent a decrease of the productivity and increase the film stress to a satisfactory range, the film is preferably formed with a thickness of 200 nm or less. In particular, a metal is used in the intermediate layer 104, the thickness of the intermediate layer 104 is preferably set at 20 nm or less in order to prevent an excessive decrease of light transmission.

As a material for forming the intermediate layer 104, mention may be made of a dielectric material such as a metal thin film, silicon oxide, silicon nitride, $MgF_2$, $SnO_2$, and ZnS—$SnO_2$.

Note that a layer formed of a similar material(s) to that used in the intermediate layer 104 may be arranged between the substrate (1) 101 and the recording layer (1) 103, between the substrate (2) 109 and the recording layer (2) 108, and between the recording layer (2) 108 and the reflective layer (2) 107, and so on separately.

(Transparent Resin Layer)

Next, the transparent resin layer 105 arranged in contact with the inverted-stack structure (11) at the light incident side will be explained.

The transparent resin layer 105 of the dual-layer optical recording medium 100 to which this embodiment is applied, is formed of a light-transmissible material capable of permitting the laser light 110 incident on the substrate (2) 109 to reach the recording layer (1) 103. In particular, there are following relationship with the inverted-stack structure 11. In the case where a product of (E×t) (Mpa·μm) where (E) is the elastic modulus (unit: Mpa) of the transparent resin layer 105 and (t) is the thickness (unit: μm) of the transparent resin layer 105, has a predetermined value or more, when optical information is recorded on the recording layer (1) 103 of the inverted-stack structure 11, excessive deformation expanded into the adjacent tracks can be suppressed. As a result, in the optical recording medium 100, occurrence of crosstalk in the L1 layer during high-speed recording is reduced and jitter can be improved. The term "transparent" used in the transparent resin layer 105 means that the laser light 110 incident on the optical recording medium 100 is not scattered. The "scatter" used herein refers to light scattering having a significant effect upon the recording and/or reading characteristics of the optical recording medium 100.

In the dual-layer optical recording medium 100 to which the embodiment is applied, the transparent resin layer 105 has a product of (E×t) (unit: MPa·μm) obtained by multiplying the elastic modulus (E) (unit: Mpa, a measured value at a temperature of 25±5° C.) by the thickness (t) (unit: μm) of $2.0 \times 10^4$ MPa·μm or more, preferably $2.5 \times 10^4$ MPa·μm or more, more preferably $4.0 \times 10^4$ MPa·μm or more, further preferably $5.0 \times 10^4$ MPa·μm or more, particularly preferably, $7.0 \times 10^4$ MPa·μm or more, more particularly preferably $9.0 \times 10$ MPa·μm or more, and most preferably, $10.0 \times 10^4$ MPa·μm or more. When a value of (E×t) is $2.0 \times 10^4$ MPa·μm or more, the mechanical strength (rigidity) of the transparent resin layer 105 can be ensured. In addition, when optical information is recorded on the recording layer (1) 103 of the L1 layer (FIG. 1), expansion of the recording into an adjacent track(s) and excessive deformation can be suppressed.

The transparent resin layer 105 has an upper limit of a product (E×t) (unit: Mpa·μm) obtained by multiplying the elastic modulus (E) (unit: Mpa) by the thickness (t) (unit: μm) of generally $30.0 \times 10^4$ MPa·μm or less, preferably $21.0 \times 10^4$ MPa·μm or less, more preferably $17.5 \times 10^4$ MPa·μm or less, and further preferably $13.5 \times 10^4$ MPa·μm or less. When the upper limit of the product (E×t) is $30.0 \times 10^4$ MPa·μm or less, it is easy to well bring the L1 layer (FIG. 1) of the dual-layer optical recording medium 100 into focus and thus, recording and/or reading of the recording layer (1) 103 can be appropriately performed. Furthermore, for example, in the case of a film-surface incident type optical recording medium, the focal distance of an objective lens can be reduced, enabling satisfactory high-density recording.

The transparent resin layer 105 is generally composed of a resin having an elastic modulus (E) of $1.0 \times 10^3$ MPa or more, preferably $2.0 \times 10^3$ MPa or more, more preferably, $3.0 \times 10^3$ MPa or more, and further preferably, $4.0 \times 10^3$ MPa or more. When the transparent resin layer 105, which is formed of a resin having an elastic modulus (E) of $1.0 \times 10^3$ MPa or more so as to obtain a product (E×t) of $2.0 \times 10^4$ MPa·μm or more, is used, a so-called confinement effect during recording and/or reading of the L1 layer (FIG. 1) can be further enhanced. Note that the upper limit of the elastic modulus (E) is generally $6.0 \times 10^3$ MPa or less. Use of a resin having an elastic modulus (E) of $6.0 \times 10^3$ MPa or less makes it possible to form the transparent resin layer 105 by a solution method such as coating method, and is thus industrially advantageous.

Figure 3A:
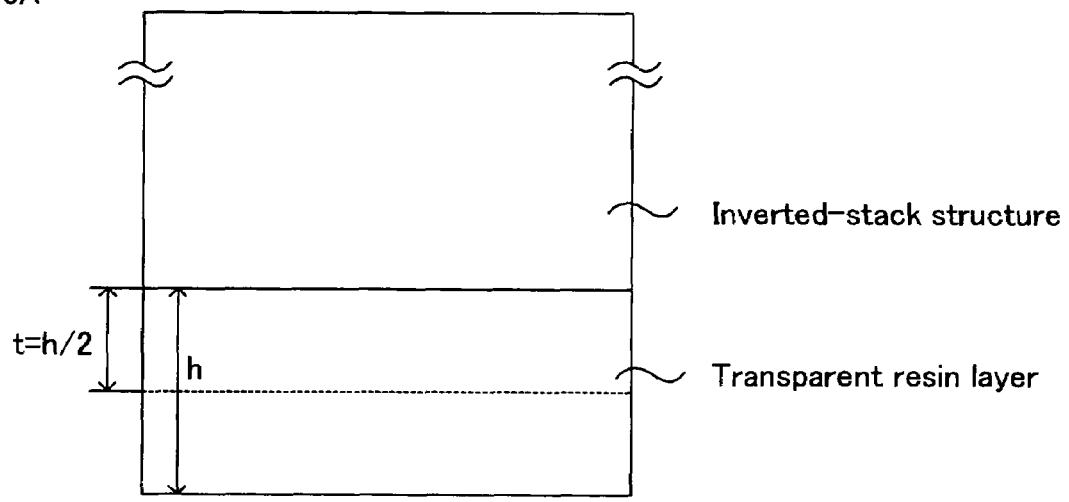
FIG. 3A is a view of the transparent resin layer formed of a single resin.
Figure 3B:
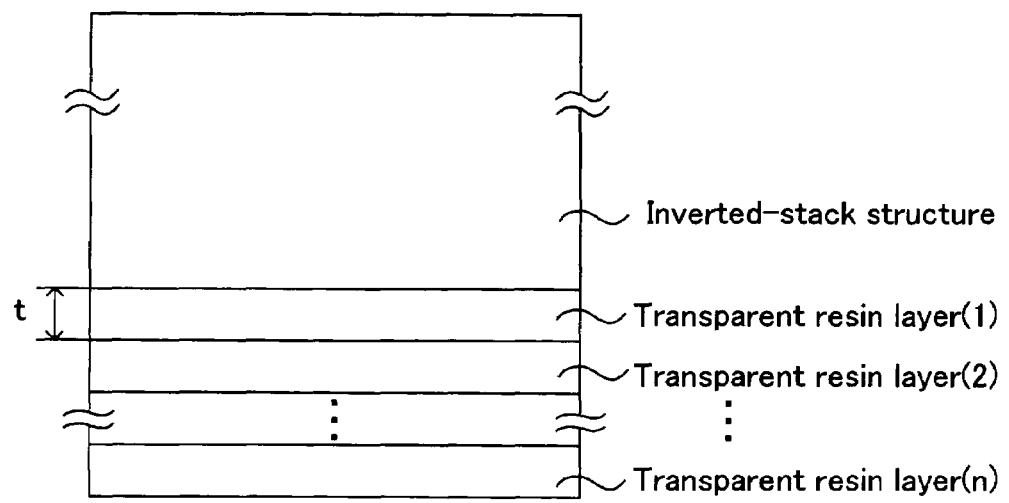
FIG. 3B is a view of the transparent resin layer formed of a plurality of resin layers.

Next, the thickness (t) of the transparent resin layer 105 will be explained. FIG. 3 illustrates the thickness (t) of the transparent resin layer. FIG. 3A shows the case where the transparent resin layer is formed of a single type resin, whereas FIG. 3(b) shows the case where the transparent resin layer is formed of a plurality of types of resin layers. More specifically, the thickness (t) of the transparent resin layer 105 in the case where the transparent resin layer 105 is formed of a single type resin (Case a) and in the case where the transparent resin layer 105 is formed of a plurality of types of resin layers (Case b) is explained as follows.

(Case a)

When the transparent resin layer in contact with the inverted-stack structure is formed of a single type of resin, as shown in FIG. 3A, the thickness (t) of the transparent resin layer is defined as a half (h/2) of the film thickness (h) of the transparent resin layer, while the film thickness of the part on the side in contact with the inverted-stack structure is defined as a thickness (t) of the transparent resin layer.

When the transparent resin layer 105 is formed of a single type of resin, it is considered that the portion of the transparent resin layer 105 in contact with the inverted-stack structure 11 may have a significant effect on crosstalk of the L1 layer of the inverted-stack structure 11. In other words, the portion of the transparent resin layer 105 not in contact with the inverted-stack structure 11 is considered not to effectively work in imparting local restraint force for preventing expansion of recording into an adjacent track (s) in recording optical information on the recording layer (1) 103 of the L1 layer. Accordingly, when the transparent resin layer 105 is consisting of a single type of resin, the thickness (t) of the transparent resin layer 105 corresponds to ½ of the distance between the L1 layer and the L0 layer (See FIG. 1) while the film thickness of the part on the side in contact with the inverted-stack structure 11 is defined as a thickness (t) of the transparent resin layer 105.

In the dual-layer optical recording medium 100 shown in FIG. 1, the film thickness (h) of the transparent resin layer 105 is generally 200 μm or less, preferably 100 μm or less, and more preferably 80 μm or less. In particular, according to the standard of a dual-layer DVD disk, the distance between the L1 layer and the L0 layer is preferably from 40 μm to 70 μm. In this case, therefore, the film thickness (h) of the transparent resin layer 105 is preferably 70 μm or less. For example, the thickness (t) of the transparent resin layer 105 in (Case a) is generally 20 μm or more. Note that if the film thickness (h) of the transparent resin layer 105 is 5 μm or less, the thickness (t) of the transparent resin layer 105 is set at 5 μm. Conversely, if the film thickness (h) of the transparent resin layer 105 is 35 μm or more, the thickness (t) of the transparent resin layer 105 is set at 35 μm.

Figure 2:
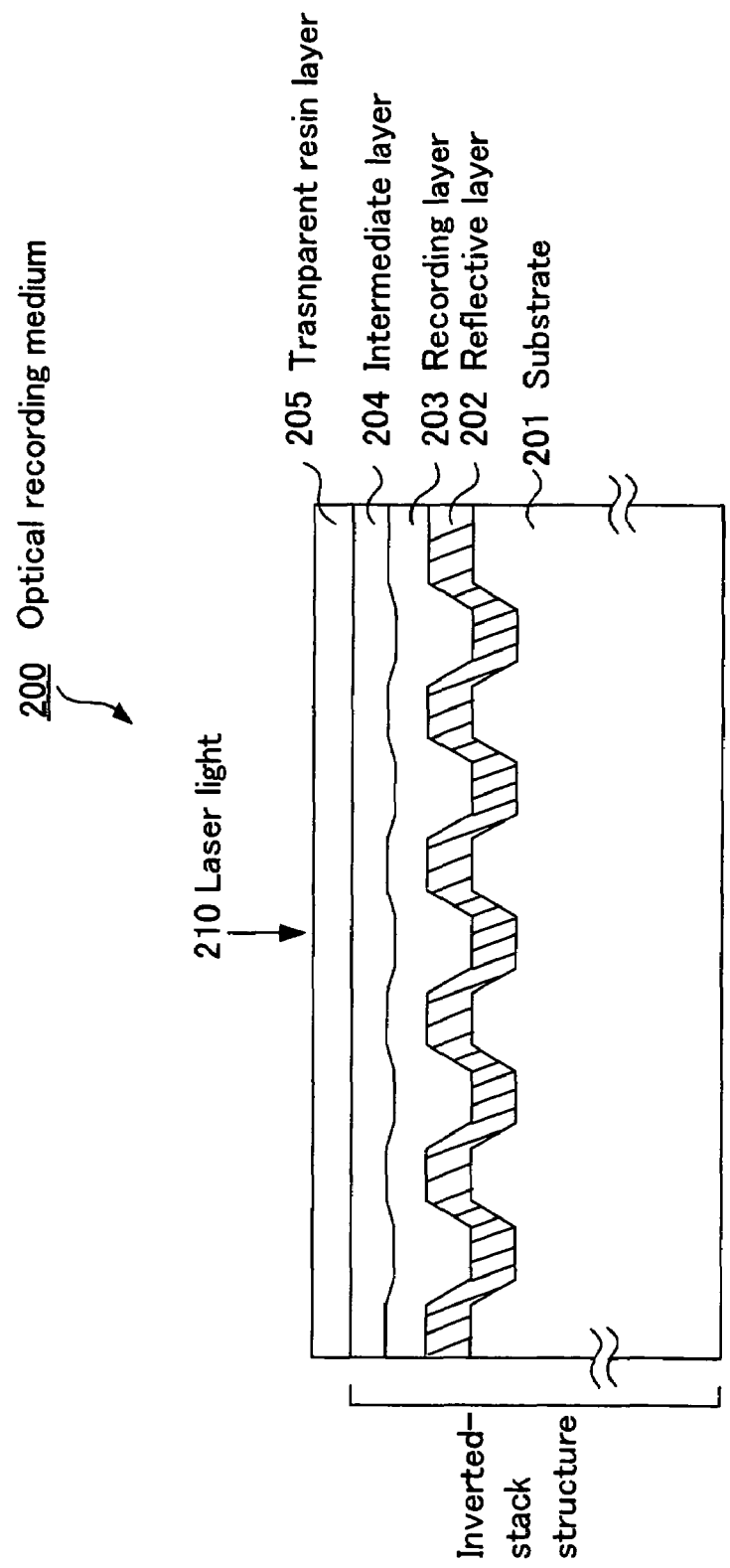
FIG. 2 is a view for explaining a second embodiment of an optical recording medium to which the present embodiment is applied.

In (Case a), when the thickness (t) of the transparent resin layer 105 falls within the aforementioned range, it is possible to bring the L1 layer of the dual-layer optical recording medium 100 in focus, with the result that the L1 layer and the L0 layer can be read satisfactorily in optically discrete conditions; at the same time, recording and/or reading operation can be appropriately made to the recording layer (1) 103. Furthermore, as described later, in the case of an optical recording medium of film surface incident type as shown in FIG. 2, the focal distance of an objective lens can be reduced and thereby a high-density recording can be satisfactorily performed. In particular, in the dual-layer optical recording medium 100, the thickness (t) of the transparent resin layer 105 in (Case a) is most preferably from 20 μm to 28 μm. When the thickness (t) of the transparent resin layer 105 falls within the range in (Case a), if the product (E×t) (where (E) is the elastic modulus of the transparent resin layer 105, and (t) is the thickness of the transparent resin layer 105) is set at $2.0 \times 10^4$ (MPa·μm) or more, stable recording of the L1 layer can be made.

(Case b)

When the transparent resin layer is formed of a plurality of types of resin layers (transparent resin layer (1), transparent resin layer (2) ... transparent resin layer (n)) as shown in FIG. 3(b), of the plurality of resin layers, the thickness of the resin layer in contact with the inverted-stack structure is defined as the thickness (t) of the transparent resin layer. However, when the film thickness of the transparent resin layer (1) in contact with the inverted-stack structure is 35 μm or more, the thickness (t) of the transparent resin layer is defined as 35 μm.

As a method of manufacturing the dual-layer optical recording medium 100, mention may be made of a method comprising applying light transmissible resin A onto the inverted-stack structure 11 having the L1 layer; on the other hand, applying resin B onto the conventional-stack structure 12 having the L0 layer, and bringing resin A in contact with resin B to cure them, thereby preparing a dual-layer disk. In this case, as described above, the resin layer (formed of resin B) on the side of the transparent resin layer 105 not in contact with the inverted-stack structure 11 is considered not to effectively work in giving local restraint force for preventing expansion of recording into adjacent track(s) when optical information is recorded on the recording layer (1) 103 of the L1 layer. Accordingly, in the resin layer near the conventional-stack structure 12 having the L0 layer, UV curable resin and UV curable adhesive agent can be used unlike the resin layer in contact with the inverted-stack structure 11. Furthermore, the transparent resin layer 105 is preferably formed by stacking a flexible resin layer which is capable of reducing the entire stress and a resin layer having a product of (E×t) of not less than a predetermined value.

In (Case b), the entire film thickness of the transparent resin layer 105 of the dual-layer optical recording medium 100 is generally 200 μm or less, preferably 100 μm or less, and more preferably 80 μm or less. In particular, according to the standard of dual-layer DVD disk, the distance between the L1 layer and the L0 layer is from 40 μm to 70 μm. Of the plurality types of resin layers forming the transparent resin layer 105, if the resin layer (transparent resin layer (1) in FIG. 3(b)) in contact with the inverted-stack structure 11 has a thickness of 35 μm or more, the thickness (t) of the transparent resin layer 105 is set at 35 μm. The thickness of the resin layer (transparent resin layer (1) in FIG. 3(b)) in contact with the inverted-stack structure 11 is preferably 3 μm or more, in general, more preferably 4 μm or more, further preferably 10 μm, and particularly preferably, 15 μm or more. When the thickness (t) of the transparent resin layer 105 is excessively small, the effect on reducing crosstalk may not be obtained sufficiently.

Of the plurality of types of resin layers forming the transparent resin layer 105, if the resin layer (transparent resin layer (1) in FIG. 3(b)) in contact with the inverted-stack structure 11 has a film thickness of 5 μm or less, the thickness (t) is set at 5 μm and a product of (E×t) is calculated by the following method. To explain more specifically, a product (E×t) is calculated by multiplying the elastic modulus (E) of the transparent resin layer 105 by the thickness (t) of the transparent resin layer 105, provided that the transparent resin layer is regarded as a composite resin layer, more specifically, a composite resin layer of the transparent resin layers (1)+(2) of 5 μm in thickness (t). For example, provided that the resin layer in contact with the inverted-stack structure 11 (the transparent resin layer (1) in FIG. 3(b)) has an elastic modulus of E1 and a film thickness of 1 μm, and the adjacent resin layer (the transparent resin layer (2) in FIG. 3(b)) of the resin layer (the transparent resin layer (1) in FIG. 3(b)) in contact with the inverted-stack structure 11 has an elastic modulus of E2, a product (E×t) is calculated in accordance with the equation: E1×1+E2×4. In this case, the total film thickness of the transparent resin layer (1) and the transparent resin layer (2) is assumed to be 5 μm or more. For example, in the case where the total film thickness of the transparent resin layer (1)+(2)+(3) is 5 μm, a product (E×t) maybe calculated in accordance with the aforementioned example of equation.

Now, a material forming the transparent resin layer 105 will be specifically explained.

As a material forming the transparent resin layer 105, mention is made of a thermoplastic resin, thermosetting resin, electron beam setting resin, UV curable resin (including delayed curable resin) and the like. A material forming the transparent resin layer 105 is appropriately selected from these. A resin such as a thermoplastic resin and thermosetting resin is, if necessary, dissolved in an appropriate solvent to prepare a coating solution, which is then applied to a substrate and dried (with heating) to form the transparent resin layer 105. A UV curable resin may be directly applied to a substrate or dissolved in an appropriate solvent to prepare a coating solution, which is then applied to a substrate and cured by application of UV rays, thereby forming the transparent resin layer 105. These materials may be used singly or in the form of a mixture.

As a coating method, spin coating and cast coating, etc., may be used. Of them, a spin coat method is preferable. A highly viscous resin may be applied to a substrate by a screen print method to form a resin layer. For the UV curable resin, a liquid UV curable resin from 20° C. to 40° C. is preferably used because coating can be made without using a solvent, contributing to good productivity. The viscosity of the coating liquid is preferably adjusted from 20 mPa·s to $1.0 \times 10^3$ mPa·s.

Of the materials forming the transparent resin layer 105, a UV curable resin is preferable since it has a high transparency and a short curing time, and thus advantageous in production. As a UV curable resin, mention may be made of a radical UV curable resin and a cationic UV curable resin. Either one of the above-mentioned resins can be used. A radical UV curable resin is provided in the form of a composition containing a UV curable compound and a photopolymerization initiator as essential components. As the UV curable compound, use may be made of a compound containing a single functional (meth)acrylate and a polyfunctional (meth)acrylate as polymerization monomer units. They may be used singly or in combination of two types or more. An acrylate and a methacrylate are herein collectively referred to as "(meth)acrylate".

Examples of the single functional (meth)acrylate include (meth)acrylates having substituents such as methyl, ethyl, propyl, butyl, amyl, 2-ethylhexyl, octyl, nonyl, dodecyl, hexadecyl, octadecyl, cyclohexyl, benzyl, methoxyethyl, butoxyethyl, phenoxyethyl, nonyl phenoxyethyl, tetrahydrofurfuryl, glycidyl, 2-hydroxyethyl, 2-hydroxypropyl, 3-chloro-2-hydroxypropyl, dimethylaminoethyl, diethylaminoethyl, nonylphenoxyethyl tetrahydrofurfuryl, caprolactone, modified tetrahydrofurfuryl, isobornyl, dicyclopentanyl, dicyclopentenyl, and dicyclopentenyloxyethyl groups.

Examples of polyfunctional (meth)acrylate include di(meth)acrylates of 1,3-butyleneglycol, 1,4-butanediol, 1,5-pentanediol, 3-methyl-1,5-pentanediol, 1,6-hexanediol, neopentylglycol, 1,8-octranediol, 1,9-nonanediol, tricyclodecanedimethanol, ethylene glycol, polyethylene glycol, propylene glycol, dipropylene glycol, tripropylene glycol, and polypropylene glycol, and the like; and di(meth)acrylates of tris(2-hydroxyethyl)isocyanurate.

Further mention may be made of di(meth)acrylate of a diol obtained by adding not less than 4 moles of ethylene oxide or propylene oxide to one mole of neopentyl glycol; di(meth) acrylate of a diol obtained by adding 2 moles of ethylene oxide or propylene oxide to one mole of bisphenol A; di or tri (meth) acrylate of a triol obtained by adding not less than 3 moles of ethylene oxide or propylene oxide to one mole of trimethylol propane; di(meth)acrylate of diol obtained by adding not less than 4 moles of ethylene oxide or propylene oxide to one mole of bisphenol A; trimethylolpropane tri (meth)acrylate, pentaerythritol tri(meth)acrylate, poly(meth) acrylate of dipentaerythritol, phosphoric acid (meth)acrylate modified with ethylene oxide, alkylated phosphoric acid (meth)acrylate modified with ethylene oxide and the like.

As a substance to be used simultaneously with these polymeric monomers, mention maybe made of polymeric oligomers such as polyester(meth)acrylate, polyether(meth)acrylate, and epoxy(meth)acrylate, and urethane(meth)acrylate.

Furthermore a radical UV curable resin is generally used together with a photopolymerization initiator. As a preferable photopolymerization initiator, mention may be made of a molecule-cleaving type initiator and a hydrogen-removing type initiator. Examples of such a molecule-cleaving type initiator as a photopolymenzation initiator include benzoin isobutyl ether, 2,4-diethylthioxanthone, 2-isopropylthioxanthone, benzyl, 2,4,6-trimethylbenzoyl diphenylphosphinoxide, 2-benzyl-2-dimethylamino-1-(4-morpholinophenyl)-butan-1-one, bis(2,6-dimethoxybenzoil)-2,4,4-trimethylpentylphosphinoxide and the like.

Furthermore, 1-hydroxycyclohexylphenyl ketone, benzoin ethyl ether, benzyldimethyl ketal, 2-hydroxy-2-methyl-1-phenylpropan-1-one, 1-(4-isopropylphenyl)-2-hydroxy-2-methylpropan-1-one, and 2-methyl-1-(4-methylthiophenyl)-2-morpholinopropan-1-one, etc. may be used in combination. As the hydrogen removing type photopolymerization initiator, mention may be made of benzophenone, 4-phenylbenzophenone, isophthalphenone, 4-benzoyl-4'-methyl-diphenylsulfide and the like.

Furthermore, a sensitizer maybe used in combination with a photopolymerization initiator. As the sensitizer, mention may be made of trimethylamine, methyldimethanolamine, triethanolamine, p-diethylaminoacetophenone, ethyl p-dimethylaminobenzoate, isoamyl p-dimethylaminobenzoate, N,N-dimethylbenzylamine, and 4,4'-bis(diethylamino)benzophenone, etc.

As the cationic UV curable resin, mention may be made of an epoxy resin containing a cationic polymeric photopolymerization initiator. Examples of the epoxy resin include bisphenol A (epichlorohydrin type), alicyclic epoxy, long-chain aliphatic epoxy, bromated epoxy, glycidyl ester type epoxy, glycidyl ether type epoxy and heterocyclic epoxy resins. Of the epoxy resins, an epoxy resin containing a low amount of free chlorine and chlorine ion is preferably used. The content of chlorine is preferably 1% by weight or less, and more preferably 0.5% by weight or less.

As the cation polymeric photopolymerization initiator, mention may be made of a sulfonium salt, iodonium salt, diazonium salt and the like. Examples of the iodonium salt include diphenyliodonium hexafluorophosphade, diphenyliodonium hexafluoroantimonate, diphenyliodonium tetrafluoroborate, diphenyliodoniumtetrakis(pentafluorophenyl)borate, bis(dodecylphenyl)iodonium hexafluorophosphate, bis(dodecylphenyl)iodonium hexafluoroantimonate, bis(dodecylphenyl)iodonium tetrafluoroborate, and bis(dodecylphenyl)iodonium tetrakis(pentafluorophenyl) borate.

Furthermore, mention may be made of 4-methylphenyl-4-(1-methylethyl)phenyliodonium hexafluorophosphate, 4-methylphenyl-4-(1-methylethyl)phenyliodonium, hexafluoroantimonate, 4-methylphenyl-4-(1-methylethyl) phenyliodonium tetrafluoroborate, 4-methylphenyl-4-(1-methylethyl)phenyliodonium tetrakis(pentafluorophenyl)borate and the like.

The ratio of a cation polymeric photopolymerization initiator to 100 parts by weight of a cationic UV curable resin is generally from 0.1 part by weight to 20 parts by weight, preferably from 0.2 parts by weight to 5 parts by weight. Note that a known photosensitizer can be used in combination in order to more efficiently use a wavelength of the UV region, near UV region and visible wavelength region. Examples of such a sensitizer include anthracene, phenothiazine, benzylmethylketal, benzophenone, and acetophenone.

To the UV curable resin, if necessary, other additives including a thermal polymerization inhibitor, an oxidation inhibitor such as hindered phenol, hindered amine, and phosphite, a plasticizer, and a silane coupling agent such as epoxy silane, mercapto silane, (meth)acryl silane, may be added in order to improve various characteristics. Among them, additives exhibiting excellent solubility in a UV curable compound and not inhibiting transmission of UV rays are chosen and put in use.

In the optical recording medium 100 to which the embodiment is applied, a means for attaining not less than $2.0 \times 10^4$ MPa·μm of a product of (E×t) (where E is the elastic modulus of the transparent resin layer 105 and t is the thickness of the transparent resin layer 105), is not particularly limited. However, in preparing a resin having an appropriate rigidity within the most suitable range of film thickness, in order to widen the film thickness range, the following method may be employed. A method of increasing the content of a monomer component having two or more, preferably, three or more methacryloyl groups within a molecule as the UV curable resin as mentioned above; a method of increasing the content of a side chain containing polymer diol, such as a polyester diol, to be mixed with a straight-chain polymer diol; a method of increasing an intramolecular bond by reducing the molecular weight of a side chain being an oligomer component whose main chain is a hard segment; a method of adding a cross-linking agent such as a polyisocyanate compound, amino resin, epoxy compound, silane compound, and metal chelate compound, in a predetermined amount. By virtue of such a means, the elastic modulus of the transparent resin layer 105 itself can be increased, with the result that the glass transition temperature (Tg) of the resin forming the transparent resin layer 105 can be increased as high as a temperature beyond about 150° C.

Of the UV curable resins, a cationic UV curable resin is preferable because it has a low light scattering characteristic and low viscosity enabling spin coating application. Furthermore, when the thickness of transparent resin layer 105 is 10 μm or more, it is not necessary to take oxygen inhibition against curing into consideration. Therefore, a radial UV curable resin is preferably used since it may be selected from many types of resins and it has a large degree of freedom in a mixing ratio and in a composition.

Note that a transparent resin layer used in an optical recording medium (a commercial product) can be detected by the following method as mentioned below.
(1) An optical disk is broken into some pieces and a disk-cross-section is taken out and placed under microscopic observation by a secondary electron microscope (SEM). In this manner, the microscopic structure (morphology) of a transparent resin layer can be observed. If the microscopic structure differs in the thickness direction, it can be found that the transparent resin layer is formed of the plurality of types of resin layers.
(2) The cross-section of a transparent resin layer is analyzed by microscopic FT-IR method to obtain an infrared absorption spectrum of the transparent resin layer. Compared to infrared absorption spectrum of a reference resin determined by the aforementioned method, the composition of the rein (of the transparent resin layer) can be identified to some extent based on the reference spectrum. If the infrared absorption spectra mutually differ within the transparent resin layer in the thickness direction, it is found that the transparent layer is formed of the plurality of types of resin layers. These compositions can be identified to some extent by comparison with spectra of the aforementioned reference samples.
(3) When the transparent resin layer is analyzed by the thermolysis GC-MS method, the composition of a resin can be identified.
(4) When the transparent resin layer is peeled off and taken out, Tg and elastic modulus can be directly determined by a dynamic viscoelastic modulus determination apparatus.

(Conventional-stack Structure)

Now, the conventional-stack structure 12 forming the optical recording medium 100 to which the embodiment is applied will be explained. As shown in FIG. 1, the conventional-stack structure 12 is formed of the substrate (2) 109 having an incident surface of the laser light 110 serving as recording and/or reading light, and the recording layer (2) 108, the reflective layer (2) 107, and protective coating layer 106 sequentially stacked on the substrate (1) 109 (these stacked layers will sometimes referred to as a "L0 layer")

The substrate (2) 109 of the conventional-stack structure 12 is composed of a similar material to that used in the substrate (1) 101 of the inverted-stack structure 11. However, the substrate (2) 109 must be light transmissible. The groove width (half-value width) of the substrate (2) 109 is generally 2 T/10 or more and preferably 3 T/9 or more where T is a track pitch. When the groove width falls within this range, the reflectivity can be sufficiently ensured. To explain more specifically, provided that the track pitch is 740 nm, the groove width of the substrate (2) 109 becomes 148 nm or more, and preferably 246 nm or more; however the groove width of the substrate (2) 109 is generally 7 T/10 or less and preferably 6 T/10 or less. For example, in the case of a track pitch of 740 nm, the groove width of the substrate (2) 109 becomes generally 518 nm or less and preferably 444 nm or less. Since the transferability of a groove geometry can be improved, this example-case is preferable.

The groove depth of the substrate (2) 109 is preferably set at $\lambda/10$ or more in general where $\lambda$ is the wavelength of recording and/or reading light since the reflectivity can be sufficiently ensured. The groove depth is more preferably set at $\lambda/8$ or more, and further preferably $\lambda/6$ or more. For example, provided that the wavelength $\lambda$ (recording and/or reading wavelength) of the recording and/or reading light, is 660 nm, the groove depth of the substrate (2) 109 becomes generally 66 nm or more, preferably 83 nm or more, and more preferably, 110 nm or more. However, the upper limit of the groove depth of the substrate (2) 109 is preferably set at $2\lambda/5$ or less since the groove geometry is satisfactorily transferred, and more preferably $2\lambda/7$ or less. More specifically, provided that the recording and/or reading wavelength is 660 nm, the groove depth is generally 264 nm or less and preferably 189 nm or less.

(Recording Layer (2))

The recording layer (2) 108 of the conventional-stack structure 12 contains a similar dye to that used in the recording layer (1) 103 of the inverted-stack structure 11. The suitable thickness of the recording layer (2) 108 of the conventional-stack structure 12 differs depending upon the recording method, etc., and is therefore not particularly limited; however, generally, it is 20 nm or more, preferably 30 nm or more, and particularly preferably 40 nm or more to obtain sufficient modulation amplitude. However, since light must be transmitted, the thickness of the recording layer (2) 108 is generally 200 nm or less, preferably 180 nm or less, and more preferably 150 nm or less. Note that the thickness of the recording layer (2) 108 refers to the film thickness of the thicker portion (that is, the thickness of the recording layer (2) 108 of the groove portion of the substrate (2) 109).

(Reflective Layer (2))

The reflective layer (2) 107 of the conventional-stack structure 12 is consisting of a similar material to that used in the reflective layer (1) 102 of the inverted-stack structure 11. The reflective layer (2) 107 of the conventional-stack structure 12 must absorb a small amount of laser light 110 serving as a recording and/or reading light incident on the substrate (2) 109, and have a light transmissibility of generally 406 or more, and an appropriate light reflectivity of 30% or more. For example, if a thin film of a metal having a high reflectivity is applied, an appropriate transmission can be obtained. In addition, the reflective layer (2) 107 desirably has a certain degree of a corrosion resistance and further a blocking characteristic so as to block the component(s) penetrating from the upper layer of the reflective layer (2) 107 (transparent resin layer 105 herein) from affecting the recording layer (2) 108 provided under the reflective layer (2) 107.

The thickness of the reflective layer (2) 107 is generally 50 nm or less, preferably 30 nm or less, and further preferably 25 nm or less to ensure a light transmission of 40% or more in general; however, 3 nm or more and preferably 5 nm or more in general such that the recording layer (2) 108 is not influenced by the component(s) penetrating from the upper layer of the reflective layer (2) 107.

(Protective Coating Layer)

The protective coating layer 106 of the conventional-stack structure 12 is provided on the surface of the reflective layer (2) 107 facing the transparent resin layer 105 in order to prevent the reflective layer (2) 107 from oxidation, dust contamination, and damage and soon. The material of the protective coating layer 106 is not particularly limited as long as it can protect the reflective layer (2) 107. As an organic material, mention may be made of a thermoplastic resin, thermosetting resin, electron beam setting resin, TV curable resin and the like. As an inorganic material, mention may be made of dielectric substances such as silicon oxide, silicon nitride, $MgF_2$, and $SnO_2$ and so on. Particularly, a UV curable resin layer is preferably stacked. Note that the protective layer 106 is not always necessary. That is, the transparent resin layer 105 maybe directly formed on the reflective layer (2) 107.

Second Embodiment

FIG. 2 illustrates a second embodiment of an optical recording medium to which the embodiment is applied. FIG. 2 shows a film surface incident type optical recording medium 200 in which optical information is recorded and read by recording and/or reading light irradiated on the medium at the opposite side to the substrate. As shown in FIG. 2, the optical recording medium 200 is constituted by an inverted-stack structure consisting of a substrate 201, a reflective layer 202 formed on the substrate 201, a recording layer 203 stacked on the reflective layer 202, and intermediate layer 204 provided to protect the recording layer 203; and further a transparent resin layer 205 on the medium on the incident surface of laser light 210. In the optical recording medium 200, information can be recorded and read by the laser light 210 applied to the recording layer 203 through the transparent resin layer 205. Note that the intermediate layer 204 is provided if necessary, in other words, the intermediate layer 204 is not essential.

The substrate 201 forming an inverted-stack structure is formed of a similar material to that used in the substrate (1) 101 of the inverted-stack structure 11 in the optical recording medium 100 according to the first embodiment. Furthermore, the materials forming the reflective layer 202, recording layer 203 and intermediate layer 204 may be formed of similar materials as used in the reflective layer (1) 102, recording layer (1) 103 and intermediate layer 104 of the inverted-stack structure 11 of the optical recording medium 100 according to the first embodiment. Other conditions such as thickness of individual layers fall within the same range as previously explained with respect to the optical recording medium 100.

Furthermore, the transparent resin layer 205 consists of a similar material to that used in the transparent resin layer 105 of the optical recording medium 100 mentioned above. A product of (E×t) where (E) is the elastic modulus of the transparent resin layer 205 and (t) is the thickness of the transparent resin layer 205, is adjusted in the same range as mentioned with respect to the transparent resin layer 105 of the optical recording medium 100 according to the first embodiment. More specifically, the thickness (t) of the transparent resin layer 205 is defined as a half (h/2) of the film thickness (h) of the transparent resin layer 205 when the transparent resin layer 205 is formed of a single type of resin similarly to the case of the transparent resin layer 105 of the optical recording medium 100 according to the first embodiment. The thickness (t) of the transparent resin layer is defined as the film thickness of the half (h/2) of the transparent resin layer 205 in contact with the inverted-stack structure. When the transparent resin layer 205 is formed by the plurality types of resin layers, the thickness (t) of the transparent resin layer 205 is defined as the film thickness of the single resin layer of the plurality of resin layers, in contact with the inverted-stack structure. However, in the case where the film thickness of the resin layer in contact with the inverted-stack structure is 35 μm or more, the thickness (t) of the transparent resin layer 205 is set at 35 μm.

EXAMPLES

The embodiments of the present invention will be more specifically explained by way of Examples below. Note that the embodiments of the present invention will not be limited by Examples as long as they do not exceed the range of the gist.

Examples 1 to 7

Dual-layer optical recording medium having the inverted-stack structure was prepared as follows and MT (%) and ST (%) of optical information recorded on the recording layer (1) forming the inverted-stack structure were measured.

(Preparation of Optical Recording Medium)

(1) (Preparation of Inverted-stack Structure)

First, using a Ni stamper having grooves formed in the surface, polycarbonate was molded by injection to form a substrate (1) of 120 mm in diameter and 0.60 mm thick having grooves of 330 nm wide and 30 nm deep with a pitch of 0.74 μm. Next, on the substrate (1), a reflective layer (1) of 80 nm thick was formed by sputtering an Ag—Bi—Nd alloy. Subsequently, as an organic dye compound, a tetrafluoropropanol solution (concentration 2% by weight), a mixture of dye A and dye B (A:B=60:40% by weight) was prepared. The dye A and dye B represented by the chemical formulas below were metal-containing azo dyes. The solution was added dropwise onto the reflective layer (1), applied by spin coating, and dried at 70° C. for 30 minutes to form a recording layer (1). The thickness of the recording layer (1), that is, both the film thickness in the groove portion (the film thickness of the recording layer in the groove portion of the inverted-stack structure shown in FIG. 1) and the film thickness of the inter-grooves portion (the film thickness of the recording layer of the inter-grooves portion of the inverted-stack structure shown in FIG. 1) were about 80 nm.

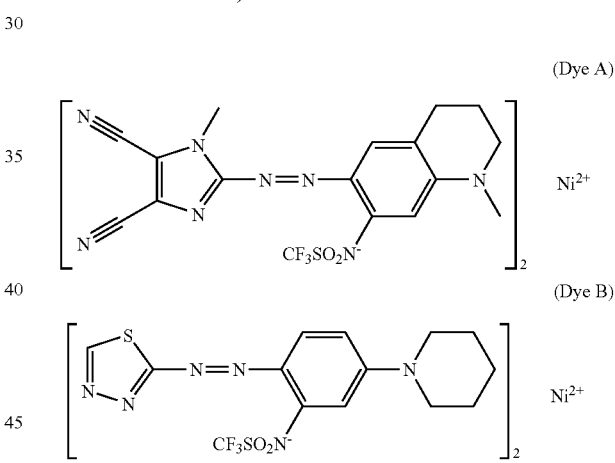

Subsequently, on the recording layer (1), an intermediate layer of 130 nm was formed by sputtering ZnS—SiO$_2$ (the component ratio is 80:20% by atom). In this manner, a disk 1 being the inverted-stack structure was prepared.

(2) (Preparation of Conventional-Stack Structure)

A substrate (2) of polycarbonate having guide grooves of 160 nm deep and 300 nm wide with a pitch of 740 nm was prepared. On the surface of the substrate (2) having guide grooves formed therein, a tetrafluoropropanol solution (concentration: 1% to 2% by weight) containing a mixture of metal-containing azo dyes, that is, dye A and dye B (A:B=60:40% by weight) as mentioned above was added dropwise, applied by spin coating, and dried at 70° C. for 30 minutes to form the recording layer (2). The thickness of the recording layer (2) (the film thickness of the recording layer in the groove portion of the conventional-stack structure shown in FIG. 1) was about 100 nm. Subsequently, on the recording layer (2), a reflective layer (2) of 17 nm was formed by sputtering an Ag—Bi alloy (Bi: 1.0% by atom) Further, on the reflective layer (2), a UV curable resin (SD347) was applied by spin coating and cured to form a protective coating layer with the film thickness of 3 μm. In this manner, a disk 2 being the conventional-stack structure was prepared.

(3) (Preparation of Dual-Layer Optical Recording Medium)

On the intermediate layer of the disk 1 being an inverted-stack structure prepared in the aforementioned method, resin A (radical UV curable resin having an elastic modulus (E) of $4.0 \times 10^3$ MPa and a glass transition temperature (Tg) of 174° C., manufactured by Dainippon Ink and Chemicals, Incorporated) was spin-coated adjusting the rotation speed employed in spin coating so as to obtain a film thickness of 23 μm. Furthermore, on the protective coating layer of the disk 2 being the conventional-stack structure, resin F (radical UV curable resin SD-6036 having an elastic modulus (E) of 680 MPa and a glass transition temperature (Tg) of 50° C., manufactured by Dainippon Ink and Chemicals, Incorporated) was spin-coated adjusting the rotation speed employed in spin coating so as to obtain a film thickness of 23 μm. Subsequently, the disks 1 and 2 coated with each of the resins surfaces were faced each other. Then, UV rays were irradiated at a side near the substrate (2) of the disk 2 (conventional-stack structure) to cure the resins A and F. In this manner, the dual-layer optical recording medium which has the transparent layer formed of the transparent resin A layer and the transparent resin B layer was prepared (Sample 1).

Subsequently, on the protective coating layer of disk 2 being a conventional-stack structure, the resin F was coated so as to obtain a film thickness of 23 μm in the same manner as in Sample 1. On the other hand, for disks 1 being the inverted-stack structure, resins B, C and D having predetermined elastic moduli (E) as shown in Table 1 each were applied on the intermediate layer of the inverted-stack structure so as to obtain a predetermined thickness (t) shown in Table 1. The disks 1 having these resins coated thereon and the disk 2 having the resin F coated thereon were overlapped such that the resin-coated surfaces faced each other in the same manner as in Sample 1. Subsequently, UV rays were irradiated to the disk 2 being the conventional-stack structure on the side near the substrate (2) to cure each of the applied resins to prepare the transparent resin layer formed of two types of resin layers. In this manner, dual-layer optical recording media were prepared (Samples 3, 5, 6, and 7).

Furthermore, disks 2 being the conventional-stack structure were prepared without applying a resin thereon. On the other hand, disks 1 being the inverted-stack structure were prepared by applying the resins B and C on the intermediate layers thereof so as to obtain predetermined thicknesses (t) shown in Table 1. The disks 1 coated with the resins were overlapped with the disks 2 not coated with a resin. Subsequently, UV rays were irradiated to each of the disks 2 (conventional-stack structure) on the side near the substrate (2) to cure the resins applied thereon to form a transparent resin layer formed of a single type of resin. In this manner, dual-layer optical recording media were prepared (Samples 2 and 4).

In the cases of optical recording media of Samples 1, 3, 5, 6 and 7 having the transparent resin layer formed of two types of resin layers, the thickness (t) of the transparent resin layer shown in Table 1 corresponds to the thickness of the resin layer in contact with the inverted-stack structure (Case b). In the cases of optical recording media of Samples 2 and 4 each having a transparent resin layer formed of a single type of resin, a half of the film thickness of the entire transparent resin layer (Case a) is employed as the thickness (t). Note that, the film thickness of the entire transparent resin layer of each of the optical recording media of Samples 1 to 7 is 46 μm.

Optical information was recorded on the recording layer (1) forming an inverted-stack structure in each of the optical recording media (Samples 1 to 7) thus prepared, in the high-speed recording conditions below, and the optical information thus recorded was read and then Mt (%) and ST (%) were measured. The results are shown in Table 1.

The high-speed recording conditions for optical information are as follows.

Evaluation apparatus: DDU-1000 (wavelength 662 nm, NA=0.65) manufactured by Pulstech Industry Co., Ltd.;

Recording speed: 4 times velocity of DVD (linear velocity: 15.3 m/s);

Recording pulse strategy: performed in accordance with the DVD-R Specification ver. 2.1;

Recording power: 26 mW to 27.5 mW;

Recording power margin: 3 mW or more; and

Jitter measurement: read at 1-time velocity.

Reference Examples 1 to 3

A dual-layer optical recording medium having an inverted-stack structure was prepared as mentioned below and Mt (%) and ST(%) of optical information were measured in the same manner as in Example 1.

In the same manner as in Sample 1 used in Example 1, disks 2 being a conventional-stack structure were prepared by applying resin F on the protective layer so as to obtain a film thickness of 23 μm. On the other hand, disks 1 being an inverted-stack structure were prepared by applying resins E and C each having a predetermined elastic modulus (E) shown in Table 1 on the intermediate layer of the inverted-stack structure so as to obtain a predetermined thickness (t) shown in Table 1. The disks 1 having these resin applied thereon and the disks 2 having resin F applied thereon were overlapped like Sample 1 such that the resin-applied surfaces faced each other. Subsequently, V rays were applied to each of the disks 2 (conventional-stack structure) on the side near the substrate (2) to cure the resins applied to form transparent resin layer formed of two types of resin layers. In this manner, the dual-layer optical recording media were prepared (Samples 8 and 9).

Furthermore, a disk 2 being a conventional-stack structure was prepared without applying a resin thereon. On the other hand, a disk 1 being an inverted-stack structure was prepared by applying resin F on the intermediate layer thereof as shown in Table 1 so as to obtain a predetermined thickness (t) shown in Table 1. The disk 1 having resin F applied thereon was overlapped with the disk 2 not coated with a resin. Subsequently, UV rays were irradiated to the disk 2 (conventional-stack structure) on the side near the substrate (2) to cure the resin applied to form a transparent resin layer formed of a single type of resin. In this manner, a dual-layer optical recording medium was prepared (Sample 10).

The thicknesses (t) of the transparent resin layers of Samples 8 to 10 will be explained. In the case of the optical recording media of Samples 8 and 9 each having the transparent resin layers formed of different resin layers, the thickness of the resin layer in contact with the inverted-stack structure is employed as the thickness (t) (Case b). In the case of the optical recording medium of Sample 10 having the transparent resin layer formed of a single type of resin, a half of the film thickness of the entire transparent resin layer is employed as the film thickness (t) (Case a). Note that the thickness of the entire transparent resin layer of each of the optical recording media of Samples 8 to 10 is 46 μm.

With respect to each of the optical recording media (Samples 8 to 10) thus prepared, optical information was recorded on the recording layer (1) forming the inverted-stack structure, in the high-speed recording conditions in the same manner as in Example 1, and the optical information thus recorded was read, and then, Mt (%) and ST (%) were measured. The results are shown in Table 1.

Note that elastic moduli (E (unit: MPa)) of resins used in preparing the transparent resin layers of Sample 1 to 10, the thickness (t (unit: μm)) of transparent resin layers, glass transition temperatures (Tg (unit:° C.)) are collectively shown in Table 1. Elastic modulus (E) was measured by a dynamic viscoelastic tester (DDV series, manufactured by Leo Vibron company) in the conditions that a measurement frequency: 3.5 Hz, and a temperature raising rate of 3° C./min.

The thickness of the transparent resin layer was measured based on a secondary electron microscopic image (SEM image) observed by a scanning electron microscope or a sectional microscopic image observed by a transmission electron microscope. The thickness (t) is an average value of 5-point measurement values.

(E×t) where (E) is the elastic modulus of the transparent resin layer in contact with the inverted-stack structure and (t) is the thickness of the transparent resin layer is plotted (the abscissa axis) and a numeral value of MT (%) obtained based on a read signal of optical information recorded on the recording layer (1) of the inverted-stack structure is plotted.

Figure 4:
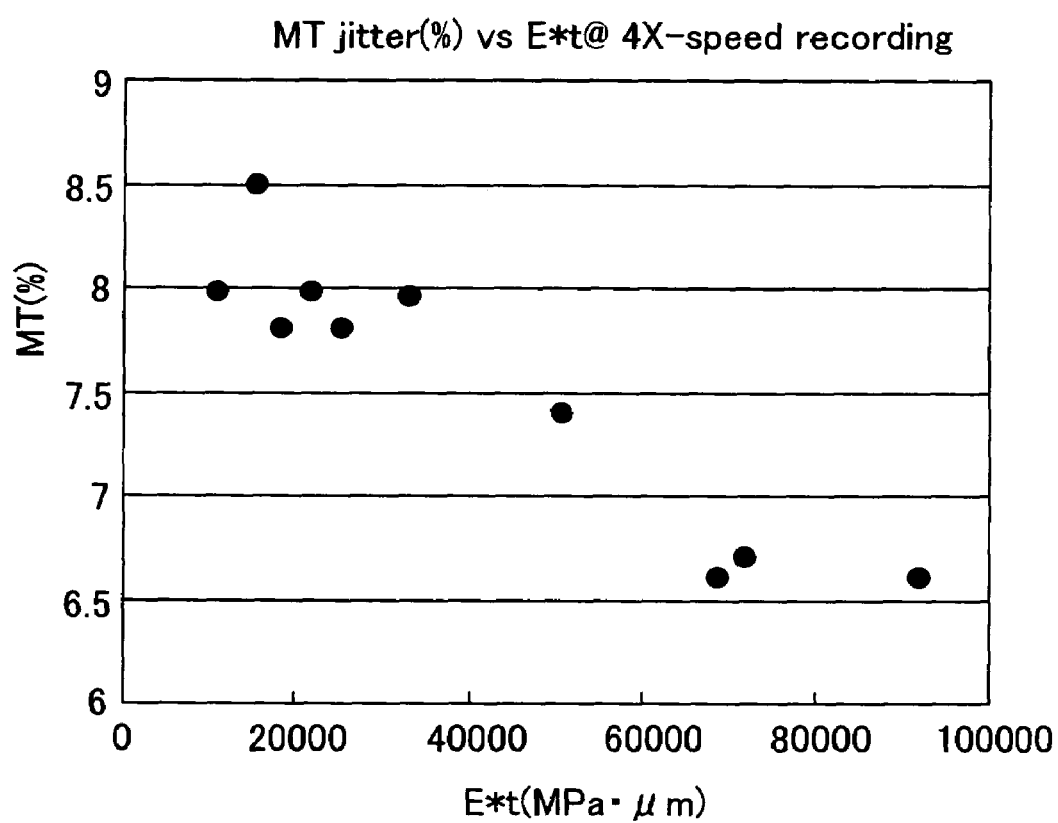
FIG. 4 is a view for explaining a relationship between (E×t) and MT(%) of Samples 1 to 10.

As is apparently shown in FIG. 4, when a value (E×t) exceeds $2.0 \times 10^4$ Mpa·μm or more, MT (%) becomes 8% or less. When a value (E×t) exceeds $4.0 \times 10^4$ Mpa·μm, MT (%) becomes around 7.5%, and when a value (E×t) is $6.0 \times 10^4$ Mpa·μm, MT (%) becomes about 7%. Furthermore, when a value (E×t) exceeds $6.9 \times 10^4$ Mpa·μm, MT (%) becomes about 6.5%, and when a value (E×t) exceeds $9.0 \times 10^4$ Mpa·μm or more, MT (%) reaches a favorable value, stably around 6.55%. Moreover, it is indicated that, at a value (E×t) of $10.0 \times 10^4$ Mpa·μm or more, MT (%) reaches an ideal state where MT (%) is maintained at the minimum value.

Considering the glass transition temperatures of the resins shown in Table 1, the glass transition temperature of the transparent resin layer in contact with the inverted-stack structure is preferably 150° C. or more. This is because it is

TABLE 1

|  |  | Sample | Resin | E(Mpa)/(° C.) | Thickness t (μm) | Tg (° C.) | E* t (Mpa · μm) | MT (%) | ST (%) |
|---|---|---|---|---|---|---|---|---|---|
| Example | 1 | 1 | A | 4000/(25) | (b)23 | 174 | 92000 | 6.6 | 5.8 |
|  | 2 | 2 | B | 3000/(30) | (a)24 | 181 | 72000 | 6.7 | 6.5 |
|  | 3 | 3 | B | 3000/(30) | (b)23 | 181 | 69000 | 6.6 | 5.9 |
|  | 4 | 4 | C | 2200/(30) | (a)23 | 147 | 50600 | 7.4 | 5.9 |
|  | 5 | 5 | C | 2200/(30) | (b)15 | 147 | 33000 | 7.96 | 6.3 |
|  | 6 | 6 | D | 1100/(30) | (b)23 | 76 | 25300 | 7.8 | 6 |
|  | 7 | 7 | C | 2200/(30) | (b)10 | 147 | 22000 | 7.98 | 6.2 |
| Reference | 1 | 8 | E | 2300/(30) | (b)8 | 149 | 18400 | 7.8 | 6.3 |
| Example | 2 | 9 | C | 2200/(30) | (b)5 | 147 | 11000 | 7.98 | 6.11 |
|  | 3 | 10 | F | 680/(30) | (a)23 | 50 | 15640 | 8.5 | 6.4 |

The resins used in preparing transparent resin layers of Table 1 are as follows:

Resin A: radical UV curable resin (elastic modulus: $1.4 \times 10^3$ MPa/(150° C.)) manufactured by Dainippon Ink and Chemicals, Incorporated;

Resin B: radical UV curable resin (elastic modulus: $1.05 \times 10^3$ MPa/(150° C.)) manufactured by Dainippon Ink and Chemicals, Incorporated;

Resin C: radical UV curable resin SD-347 (elastic modulus: 340 MPa/(150° C.)) manufactured by Dainippon Ink and Chemicals, Incorporated;

Resin D: radical UV curable resin SD-394 (elastic modulus: 66 MPa/(150° C.)) manufactured by Dainippon Ink and Chemicals, Incorporated;

Resin E: radical UV curable resin SD-318 (elastic modulus: 280 MPa/(150° C.)) manufactured by Dainippon Ink and Chemicals, Incorporated; and Resin F: radical UV curable resin SD-6036 (elastic modulus: 0 MPa/(150° C.)) manufactured by Dainippon Ink and Chemicals, Incorporated.

In particular, the resins A and B were adjusted in accordance with the aforementioned method so as to have a predetermined modulus (E) and glass transition temperature (Tg) by combining an acrylic monomer improving a crosslinking density and an acrylic monomer having a rigid structure in its crosslinking structure.

Now, the results shown in Table 1 will be explained.

FIG. 4 shows a graph illustrating the relationship between a value of (E×t) and MT (%) with respect to Samples 1 to 10. In FIG. 4, based on the results shown in Table 1, a product of considered that the higher the glass transition temperature of a resin, the harder the resultant transparent resin layer is obtained.

Note that preferable conditions for an evaluation method are as follows. Using an evaluation apparatus having a semiconductor laser of 662 nm in wavelength and having an aperture (NA) of an objective lens of 0.65, recording is made at 4-times velocity of DVD (recording linear velocity: 15.3 m/s) and retrieving is made by the same evaluation apparatus at the same (1-time) velocity as that of DVD. The shortest mark length of recording is 0.44 μm.

Where the transparent resin layer in contact with the inverted-stack structure has a product (E×t) obtained by multiplying the elastic modulus (E) by the thickness (t) of a certain value or more as shown in FIG. 4, the following problem occurs during high-speed recording on the recording layer (1) of the inverted-stack structure. When ST (%), which is obtained when recording is made on a single track with no recording on the adjacent tracks, is compared with MT (%), which is obtained when recording is made on continuous tracks with no empty track, MT(%) is worse than ST(%). This problem can be overcome as above mentioned.

In other words, by adjusting the rigidity and strength as a bulk, which are represented by a product (E×t) of the transparent resin layer in contact with the inverted-stack structure, which is obtained by multiplying the elastic modulus (E) by the thickness (t), so as to fall within the specific range, it is possible to obtain an optical recording medium having low crosstalk and satisfactory jitter during high-density recording while suppressing excessive deformation expanding into the adjacent track region in the inverted-stack structure. If high-density recording can be attained, good recording characteristics can be ensured where recording is made at the shortest recording mark length of 0.44 μm or less.

Since recording is made without leaving a non-recorded in track in a general optical disk product, MT (%) represents the signal quality of the optical disk. MT (%) must be less than 10% in general, preferably 8% or less, and further preferably 7% or less. When MT (%) exceeds 10%, the number of errors tends to increase.

As is the case where Samples 1 to 10 were evaluated, when recording and/or reading is performed by an evaluation apparatus which we need not to take any consideration of a fluctuation factor such as an individual difference of a semiconductor laser mounted on a pick-up which is usually occurred to a commercially available drive, MT (%) is generally 8% or less, preferably 7.5% or less, and further preferably 7% or less. When MT (%) exceeds 8%, the manufacturing margin cannot be sometimes ensured.

Similarly, when recording and/or reading is performed by the aforementioned evaluation apparatus, ST (%) needs to be set at generally 7% or less. When ST (%) exceeds this value, MT (%) easily shows 8% or more in continuous recording.

The wider power margin of MT (%) is better. For example, the power margin giving MT (%) of 9% or less is preferably 2.5 mW or more, more preferably, 3 mW or more, and further preferably 4 mW or more. When the power margin is too small, fluctuation in light quantity of a laser light source along with a temperature change becomes larger than the power margin, with the result that satisfactory recording characteristics may not be obtained. Note that Samples 1 to 10 each exhibited a satisfactory recording power margin of 3 mW or more.

Example 8

A dual-layer optical recording medium having the inverted-stack structure was prepared as mentioned below, and then, MT (%) and ST (%) of optical information recorded on the recording layer (1) forming the inverted-stack structure were measured.

First, using a Ni stamper having grooves formed in the surface, polycarbonate was molded by injection to form a substrate (1) of 120 mm in diameter and 0.60 mm thick having grooves of 330 nm wide and 30 nm deep with a track pitch of 0.74 μm. Next, on the substrate (1), a reflective layer (1) of 80 nm thick was formed by sputtering an Ag—Bi (0.35% by atom) —Nd (0.2% by atom) alloy. Subsequently, a tetrafluoropropanol solution (concentration 2% by weight) containing a similar dye mixture (weight mix ratio 50:50) to azo-dye used in Example 1 was prepared. The tetrafluoropropanol solution was added dropwise onto the reflection layer (1), applied by spin coating, and dried at 70° C. for 30 minutes to form a recording layer (1). The thickness of the recording layer (1), that is, both the thickness in the groove portions (the film thickness of the recording layer in the groove portions of the inverted-stack structure 11 in FIG. 1) and the thickness of the inter-grooves portion (the film thickness of the recording layer in the inter-grooves portion of the inverted-stack structure 11 in FIG. 1) were about 80 nm. Subsequently, an intermediate layer formed of an inorganic substance was formed on the recording layer (1). In this manner, a disk 1 being the inverted-stack structure was prepared.

Furthermore, a conventional-stack structure was prepared in the same manner as in Example 1.

On the intermediate layer of the disk 1 being the inverted-stack structure prepared in the aforementioned method, resin B (radical UV curable resin having an elastic modulus (E) of $3.0 \times 10^3$ MPa and glass transition temperature (Tg) of 181° C., manufactured by Dainippon Ink and Chemicals, Incorporated) was spin coated adjusting the rotation speed so as to obtain a film thickness of 25 μm. Furthermore, on the film surface of the disk 2 being the conventional-stack structure, the resin B was spin coated adjusting the rotation speed so as to obtain a film thickness of 25 μm like the disk 1. Thereafter, the disks 1 and 2 coated with each of the resins were overlapped such that the resin-applied surfaces faced each other. Subsequently, UV rays were irradiated to the disk 2 (conventional-stack structure) on the side near the substrate (2) to cure the resin B to form transparent resin layers. In this manner, the dual-layer optical recording medium was prepared.

Optical information was recorded on the recording layer (1) forming the inverted-stack structure of the optical recording medium thus prepared under the following conditions and the recorded optical information was read, and then, Mt (%) and ST (%) were measured. Note that the recording conditions of optical information are as follows.

Evaluation apparatus:
2.4× velocity recording/DDU-1000 (wavelength 662 nm, NA=0.65) manufactured by Pulstech Industry Co., Ltd.
8× velocity recording/ODU-1000T5 (wavelength 658.5 nm, NA=0.65) manufactured by Pulstech Industry Co., Ltd.;
Recording speed: 2.4-times the velocity of DVD (a linear velocity of 9.22 m/s: described as 2.4×; note that a linear velocity was 3.84 m/s at a normal speed) and 8-times velocity (a linear velocity of 30.72 m/s: described as 8×);
Recording pulse strategy: performed in accordance with the DVD+R Specification ver.2.1.
Jitter measurement: read at a 1-time velocity.
Note that the recording power was 21.6 mW at 2.4× recording, P0=50 mW and Pm=29.5 mW at 8× recording. The results are shown in Table 2 together with the results of Comparative Examples 1 and 2 below.

Comparative Examples 1 and 2

Dual layer optical recording media (two samples of Comparative Examples 1 and 2) were prepared under the similar conditions as in Example 8 except that the film thicknesses of the reflective layers (1) were set at 100 nm (Comparative Example 1) and 120 nm (Comparative Example 2), respectively. Recording was performed at a velocity of 2.4× and 8× in the same manner as in Example 8. The results are shown in Table 2.

Note that in Comparative Example 1, the recording power was 21.6 mW at 2.4× recording, P0=50 mW and P0=29.5 mW at 8× recording. In Comparative Example 2, the recording power was 22.2 mW at 2.4× recording, P0=52 mW and P0=30.5 mW at 8× recording.

TABLE 2

| | Filmthickness of a reflective layer (μm) | MT(%) − ST(%) @2.4× | MT(%) − ST(%) @8× | @2.4× MT (%) | @2.4× ST (%) | @8× MT (%) | @8× ST (%) |
|---|---|---|---|---|---|---|---|
| Example 8 | 80 | −0.7 | 0.8 | 7.3 | 8 | 7.5 | 6.7 |
| Comparative Example 1 | 100 | 0.5 | 1.1 | 7.9 | 7.4 | 7.9 | 6.8 |
| Comparative Example 2 | 120 | 0.6 | 1.2 | 7.6 | 7 | 8.2 | 7 |

Figure 6:
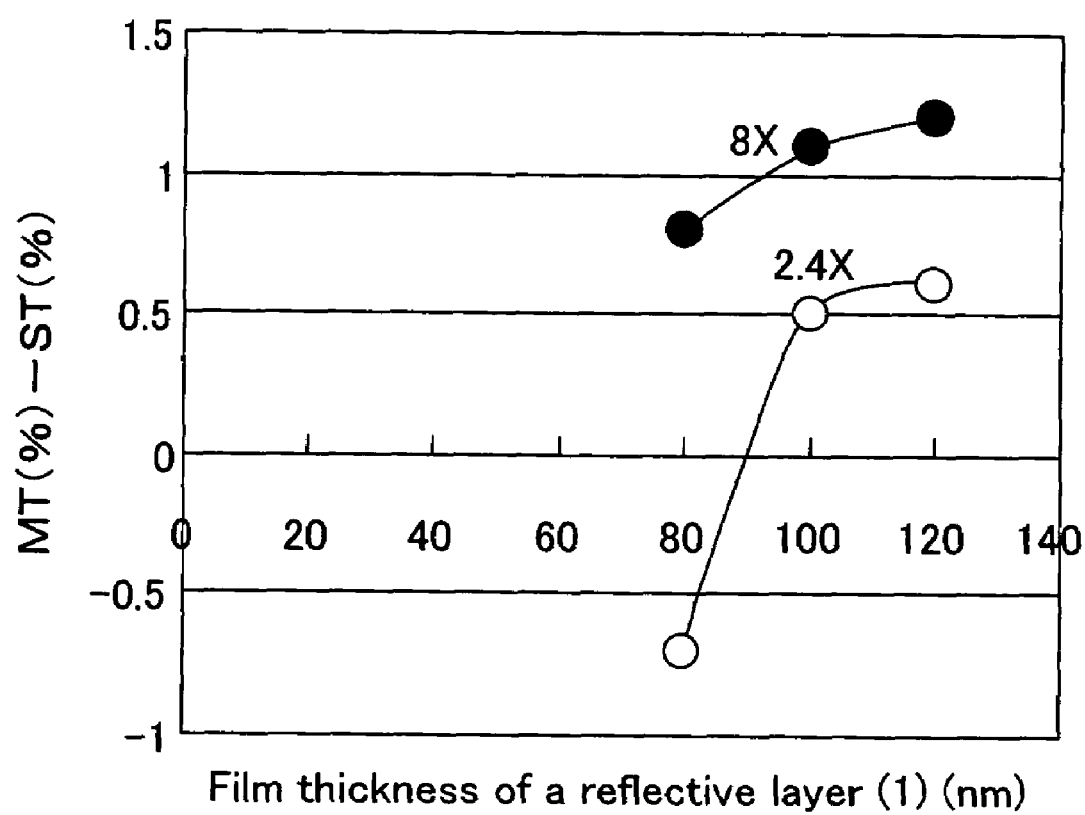
FIG. 6 is a view platting a value of (MT(%)−ST(%)) in relation to a film thickness of a reflective layer (1) based on a result shown in Table 2.

FIG. 6 is a graph plotting a value of (MT(%)−ST(%)) versus the thickness of the reflective layer (1) based on the results shown in Table 2. As shown in FIG. 6, as the thickness of the reflective layer (1) increases, a value of (MT(%)−ST(%)) increases and crosstalk likely increases. The value of (MT(%)−ST(%)) is saturated at a film thickness of 100 nm or more; however, crosstalk is worse than that of a film thickness of 80 nm.

From the results shown in FIG. 6, crosstalk, (MT(%)−ST(%)) is likely improved by setting the film thickness of the reflective layer (1) at a value lower than that of a conventional reflective layer (generally, 100 nm or more).

Note that, as explained by way of FIG. 5(*b*), reflectivity likely decreases when the film thickness of the reflective layer is 40 nm or less, and furthermore, reflectively likely decreases to a large extent when the film thickness is 30 nm or less. For this reason, it is not preferable that the film thickness of the reflective layer (1) is less than 30 nm.

As explained in the foregoing, in the optical recording medium 100 to which the embodiment is applied, it is possible to suppress an increase of crosstalk caused by protruding of a recording mark into a thick dye film portion present in a groove adjacent to the inter-grooves portion, when the transparent resin layer 105 is formed and the recording mark is formed in the inter-grooves portion (land portion) of the substrate (1) 100 of the inverted-stack structure 11.

Furthermore, the presents inventors have found in this investigation that crosstalk can be reduced by a different parameter from thermal conductivity by reducing the film thickness of the reflective layer (1) 102 within a specific range.

The present invention is based on the Japanese patent application filed on Jul. 6, 2004 (Patent application No. 2004-199770), entire of which is incorporated herein by reference.

What is claimed is:

1. An optical recording medium comprising
an inverted-stack structure having a substrate, a reflective layer, and a recording layer in this order, and
a transparent resin layer arranged on the recording layer side of the inverted-stack structure,
wherein the transparent resin layer has a product (E×t) obtained by multiplying the thickness (t) by the elastic modulus (E) at 25±5° C. of $2.0 \times 10^4$ MPa·µm or more, and
wherein the elastic modulus E of a resin forming the transparent resin layer at 25±5° C. is not less than $3.0 \times 10^3$ MPa and is not more than $6.0 \times 10^3$ MPa.

2. The optical recording medium according to claim 1, wherein the transparent resin layer has a product (E×t) obtained by multiplying the thickness (t) by the elastic modulus (E) at 25±5° C. of $30.0 \times 10^4$ MPa·µm or less.

3. The optical recording medium according to claim 1, wherein the transparent resin layer has a film thickness (h) of not less than 20 µm and not more than 200 µm.

4. The optical recording medium according to claim 1, wherein the recording layer is an organic dye-containing recording layer.

5. The optical recording medium according to claim 1, further comprising an intermediate layer between the recording layer and the transparent resin layer.

6. The optical recording medium according to claim 1, further comprising a second reflective layer, a second recording layer, and a transparent substrate arranged sequentially on the side of the transparent resin layer opposite to the side on which the inverted-stack structure is arranged.

7. An optical recording medium comprising
a recording layer in which information is recorded and/or read by irradiation with light;
a transparent resin layer arranged on the light incident surface of the recording layer;
a reflective layer arranged on the side of the recording layer opposite to the light incident surface; and
a substrate,
wherein the substrate, the reflective layer, the recording layer and the transparent resin layer are in this order,
wherein the reflective layer contains a metal having Ag as a main component and a film thickness of not less than 30 nm and of not more than 80 nm,
wherein the transparent resin layer has a product (E×t) obtained by multiplying the thickness (t) by the elastic modulus (E) at 25±5° C. of $2.0 \times 10^4$ MPa·µm or more, and
wherein the elastic modulus E of a resin forming the transparent resin layer at 25±5° C. is not less than $3.0 \times 10^3$ MPa and is not more than $6.0 \times 10^3$ MPa.

8. The optical recording medium according to claim 7, wherein the transparent resin layer is composed of a transparent resin having a glass transition temperature of 150° C. or more.

9. The optical recording medium according to claim 7, further comprising a second reflective layer and a second recording layer sequentially in this order directly or via another layer interposed therebetween on the light incident surface of the transparent resin layer, wherein an interval between the recording layer and the second recording layer is from 40 µm to 70 µm.

10. The optical recording medium according to claim 7, wherein the reflective layer contains Ag in an amount of 50% or more.

11. The optical recording medium according to claim 7, wherein the recording layer contains an organic dyestuff.

* * * * *